United States Patent [19]

Jasper

[11] Patent Number: 4,701,934
[45] Date of Patent: Oct. 20, 1987

[54] METHOD OF DOPPLER SEARCHING IN A DIGITAL GPS RECEIVER

[75] Inventor: Steven C. Jasper, Hoffman Estates, Ill.

[73] Assignee: Motorola, Inc., Schaumburg, Ill.

[21] Appl. No.: 771,754

[22] Filed: Sep. 3, 1985

[51] Int. Cl.$^4$ ............................................. H04K 1/00
[52] U.S. Cl. ........................................ 375/1; 342/418; 342/357; 364/576
[58] Field of Search ................. 375/1, 115; 343/5 PN, 343/356, 357, 386, 387, 394, 402, 418; 370/23; 364/576, 726

[56] References Cited

U.S. PATENT DOCUMENTS

| | | | |
|---|---|---|---|
| 4,313,197 | 1/1982 | Maxemchuk | 370/23 |
| 4,412,325 | 10/1983 | Molo | 370/23 |
| 4,453,165 | 6/1984 | Maine | 343/418 |
| 4,457,006 | 6/1984 | Maine | 375/97 |
| 4,494,238 | 1/1985 | Groth, Jr. | 375/1 |

Primary Examiner—Robert L. Griffin
Assistant Examiner—Stephen Chin
Attorney, Agent, or Firm—Thomas G. Berry; James E. Jacobson; Joseph T. Downey

[57] ABSTRACT

An improved method of doppler searching in a digital GPS receiver is described. According to the principles of the present invention, an N-point fourier transform is performed on samples of a down converted GPS signal representing the entire range of Doppler-shifted GPS carrier frequencies. The magnitude of the square of each of the output samples is calculated to produce N power quantities, corresponding to N search frequencies. The power quantities for each of the N search frequencies are then summed to produce N quantities proportional to average power. The maximum of the N-power quantities indicates the presence of the corresponding GPS signal.

10 Claims, 17 Drawing Figures

METHOD OF DOPPLER SEARCHING IN A DIGITAL GPS RECEIVER

FIELD OF THE INVENTION

This invention relates generally to the field of radio navigation receivers, and specifically to a doppler searching technique which is adapted for use with the Global Positioning System (GPS) navigation system. The doppler searching technique of the present invention allows a GPS receiver to rapidly achieve a locked condition.

BACKGROUND OF THE INVENTION

Radio navigation systems are used for providing useful geographic location information to aircraft pilots, mariners, and even land-based vehicles such as trucks, buses and police vehicles. Early radio navigation systems used transmitter signpost techniques which rely on phase and timing information transmitted by several terrestrial, geographically separated transmitters. One common radio navigation system currently in use is Loran which also relies on land-based transmitters to provide the navigation signals. The latest radio navigation system is referred to as the Global Positioning System (GPS), and it is maintained by the government of the United States of America.

The GPS navigation system relies of satellites which are constantly orbiting the globe. When the system is fully operational, any user of GPS, anywhere on the globe, will be able to derive precise navigation information including 3-dimensional position, velocity and time of day. The system is expected to become fully operational in 1988 with 18 satellites in orbit. Navigation fixes using GPS are based on measurements of propagation delay times of GPS signals broadcast from the orbiting satellites to the user. Normally, reception of signals from 4 satellites is required for precise location determination in 4 dimensions (latitude, longitude, altitude, and time). Once the receiver has measured the respective signal propagation delays, the range to each satellite is calculated by multiplying each delay by the speed of light. Then the location and time are found by solving a set of four equations incorporating the measured ranges and the known locations of the satellites. The highly precise capabilities of the system are maintained by means of on-board atomic clocks for each satellite and by ground tracking stations which continuously monitor and correct satellite clock and orbit parameters.

Each GPS satellite transmits two direct-sequence-coded spread spectrum signals at L-band: a L1 signal at a carrier frequency of 1.57542 GHz, and a L2 signal at 1.2276 GHz. The L1 signal consists of two phase-shift keyed (PSK) spread spectrum signals modulated in phase quadrature: the P-code signal (P for precise), and the C/A-code signal (C/A meaning coarse/acquisition or clear/access). The L2 signal contains only the P-code signal. The P and C/A codes are repetitive pseudorandom sequences of bits (called "chips" in spread spectrum parlance) which are modulated onto the carriers. The clocklike nature of these codes is utilized by the receiver in making time delay measurements. The codes for each satellite are distinct, allowing the receiver to distinguish between signals from the various satellites even though they are all at the same carrier frequency. Also modulated onto each carrier is a 50 bit/sec data stream (also distinct for each satellite) which contains information about system status and satellite orbit parameters, which are needed for the navigation calculations. The P-code signals are encrypted, and available only to classified users. The C/A signal is available to all users.

The operations performed in a GPS receiver are for the most part typical of those performed in any direct-sequence spread spectrum receiver. The spreading effect of the pseudorandom code modulation must be removed from each signal by multiplying by a time-aligned, locally-generated copy of it's code, in a process known as despreading. Since the appropriate time alignment, or code delay, is unlikely to be known at receiver start-up, it must be searched for during the initial acquisition stage. Once found, proper code time-alignment must be maintained during the "tracking" phase of receiver operation, as the user moves about. A mechanism for providing this alignment is called a delay-locked loop.

Once despread, each signal simply consists of a 50 bit/sec PSK signal at some intermediate carrier frequency. This frequency, is somewhat uncertain due to the Doppler effect caused by relative movement between satellite and user, and to receiver local clock error. During initial signal acquisition this Doppler frequency must be searched for, since it is usually unknown prior to acquisition. Once the Doppler frequency is approximately determined, carrier demodulation proceeds using a local carrier signal derived from either a squaring or a Costas carrier recovery loop. In order to maintain at a constant level the dynamic characteristics of the carrier recovery and delay-locked loops as the signal strength varies, GPS receivers are usually provided with automatic gain control (AGC).

After carrier demodulation, data bit timing is derived by a bit synchronization loop and the data stream is finally detected. A navigation calculation may be undertaken once the signals from 4 satellites have been acquired and locked onto, the necessary time delay and Doppler measurements have been made, and a sufficient number of data bits (enough to determine the GPS "system" time and orbit parameters) have been received.

To accomplish the functions described above, all known GPS receivers utilize standard analog technology with a limited amount of digital processing in the "back-end" of the receiver. The navigation computations are typically performed using a microprocessor, which is well-suited to the task. In addition, certain baseband functions, such as data detection, bit timing recovery, and some Costas loop processing, are performed digitally in known receivers. However, all pseudorandom code despreading, carrier demodulation, delay-locked loop processing, and gain control are implemented using analog components.

An example of a prior GPS receiver is shown and described in a paper by Chao, *Low Cost RF/LSI Technologies for Commerical GPS Receivers*, MICROWAVE SYSTEMS APPLICATIONS TECHNOLOGY CONFERENCE, March 1983. Another example of a prior GPS receiver is shown and described in a paper by Yiu, Crawford, and Eschenback, *A Low-Cost GPS Receiver for Land Navigation*, JOURNAL OF THE INSTITUTE OF NAVIGATION, FALL 1982.

There are several disadvantages to the processing approach used in prior GPS receivers. Due to the complex nature of the GPS signal and the complicated processing required, these receivers typically require large numbers of discrete components or highly specialized analog integrated circuits, resulting in high manufacturing cost. This is especially true if the receiver is designed to process the four required satellite signals simultaneously, since the circuitry for one "channel" must be duplicated three times. To reduce circuit complexity, some receivers employ what is known as sequential processing, where the hardware for one channel is time-shared among the four incoming signals. Receiver performance is degraded with this technique, however, since three-quarters of the information in each signal is lost.

Furthermore, conventional receivers suffer from the usual problems found with analog designs, for example, degradations in performance due to aging, temperature/humidity variations, and to mismatches in certain signal path characteristics.

Another drawback to the processing methods employed in current GPS receivers is the long time needed for initial signal acquistion. As mentioned above, before the four satellite signals can be tracked they must be searched for in a two-dimensional search "space", whose dimensions are code delay and Doppler frequency. Typically, if there is no prior knowledge of a signal's location within this search space, as would be the case after a receiver "cold start", a large number of code delays (about 2000) and doppler frequencies (about 15) must be searched. Thus, for each signal, up to 30,000 locations in the search space must be examined. Typically these locations are examined one-at-a-time sequentially, a process which can take up to 5 to 10 minutes. The acquisition time is further lengthened if the identities (i.e., codes) of the four satellites within view of the receiving antenna are unknown. Methods to shorten the acquisition time have been devised but are quite expensive to implement. One technique, for example, employs surface acoustic wave filters matched to each of the 18 satellite codes to effectively perform the despreading. Another technique utilizes multiple conventional despreading circuits operating in parallel in order to search several code delays simultaneously.

It is apparent from the above discussion that conventional GPS receivers, which rely mainly on analog technology, suffer from many disadvantages. Most prior receivers perform the GPS signal search in a sequential manner. The usual procedure is for the receiver to make a guess as to the correct code delay, setting the C/A code generator accordingly. Then, for the code delay, all frequency bins are examined for presence of signal. If no signal is found, a code generator is incremented to the next code delay and the process is repeated. The detection method typically employed in checking for signal presence can be loosely described as a variable-frequency average power "meter" followed by a threshold decision. For a given code delay/Doppler frequency trial, the C/A signal is multiplied by the locally generated C/A code, and mixed with a sinusoid whose frequency is equal to the current Doppler guess. The resultant signal is filtered by a filter whose bandwidth is commensurate with the frequency search interval Δf. If the desired signal is present in the bin being searched, the output of said filter will contain a despread 50 bit/sec data signal. The output of the filter is squared and averaged to obtain the average power, which is then compared to a threshold. If the average power is greater than the threshold, the signal is deemed present in the current bin. Otherwise, the signal is deemed absent, and the search proceeds to the next bin.

A search technique which typifies a conventional practice is described in a paper by Spilker, J. J., Jr., *Global Positioning System: GPS Signal Structure and Performance Characteristics*, THE INSTITUTE OF NAVIGATION, Vol. 1, pp. 29–54, 1980.

Due to the large number of bins to be searched (around 30,000), conventional receivers require many minutes to find a signal if a sequential search method is employed. Additional time may be incurred if the identities (i.e., codes) of the satellites within view of the receiving antenna are unknown. Methods to shorten the search time have been devised but are quite expensive to implement. Generally, these are based on the idea of examining several code delays simultaneously for each Doppler frequency in order to speed up the process. For example, one technique employs multiple despreading circuits, each with its own code generator and average power detector, operating in parallel. Therefore, a need exists for a doppler search technique which allows the GTS receiver to rapidly and efficiently search available doppler frequencies and to improve the lock-up time in the GPS receiver.

SUMMARY AND OBJECTS OF THE INVENTION

In summary, The present invention contemplates a GPS search technique for the reception of GPS C/A-code signals from up to four satellites simultaneously, using four separate receive channels. The principles of the present invention can also be applied to simultaneous reception of GPS P-code signals; to sequential reception of C/A or P-code signals using one time-shared channel; and to reception of direct-sequence-coded spread spectrum signals in general.

In accordance with the preferred embodiment of the invention, the search technique of the present invention performs doppler search in a spread-spectrum receiver, for receiving one or more direct-sequence-coded signals, each of which may be Doppler shifted from its nominal carrier frequency, wherein for each signal, a code delay/Doppler frequency search procedure must be carried out prior to activation of delay-tracking and carrier-recovery loops. For each code delay search trial, the present invention performs the steps of inputting N consecutive digitized samples of a signal equal to the filtered product of the down-converted received signal multiplied by the locally-generated code of the desired signal, the code delay of the locally-generated code being that of the current code delay search trial, the filtering passing, the band of frequencies corresponding to the entire range of possible Doppler-shifted carrier frequencies of the down-converted received signal. The method of the present invention then calculates the N-point discrete Fourier transform of the block of N samples to produce N complex-valued transformed output samples, each corresponding to one of N equally-spaced search frequencies in the band from zero Hertz to fs (or, equivalently, in the band from $-f_s/2$ to $+f_s/2$), $f_s$ being the sampling frequency of the samples input in the previous step. The square of the magnitude of each of said N complex-valued output samples is then calculted to produce N power quantities, corresponding to the N said search frequencies. These steps are performed M times, summing the M power quantities produced for each of the N said search frequencies, to produce N quantities proportional to average power. The maximum of the N average power quantitites is noted and the corresponding frequency is calculated.

The maximum average power quantity is compared to a threshold, the fact of said threshold being exceeded signifies that the current code delay is approximately correct (local code approximately time-aligned to received code), with the frequency of maximum average power indicating the approximate Doppler frequency shift, and the fact of said threshold not being exceeded signifying that the current code delay is not approximately correct, and that another code delay should be tried.

Accordingly, it is one object of the present invention to provide a GPS search technique which rapidly locates a GPS signal.

It is another object of the invention to provide a GPS search technique where all possible doppler signals are searched simultaneously.

It is yet another object of the present invention to provide an improved means for rapid initial acquisition of GPS signals.

It is still another object of the present invention to provide a GPS search technique which can be readily implmented in a general purpose Digital Signal Processor.

These and other objects of the invention will become apparent to those skilled in the art upon consideration of the following description of the invention.

DETAILED DESCRIPTION OF THE DRAWINGS

Figure 1:
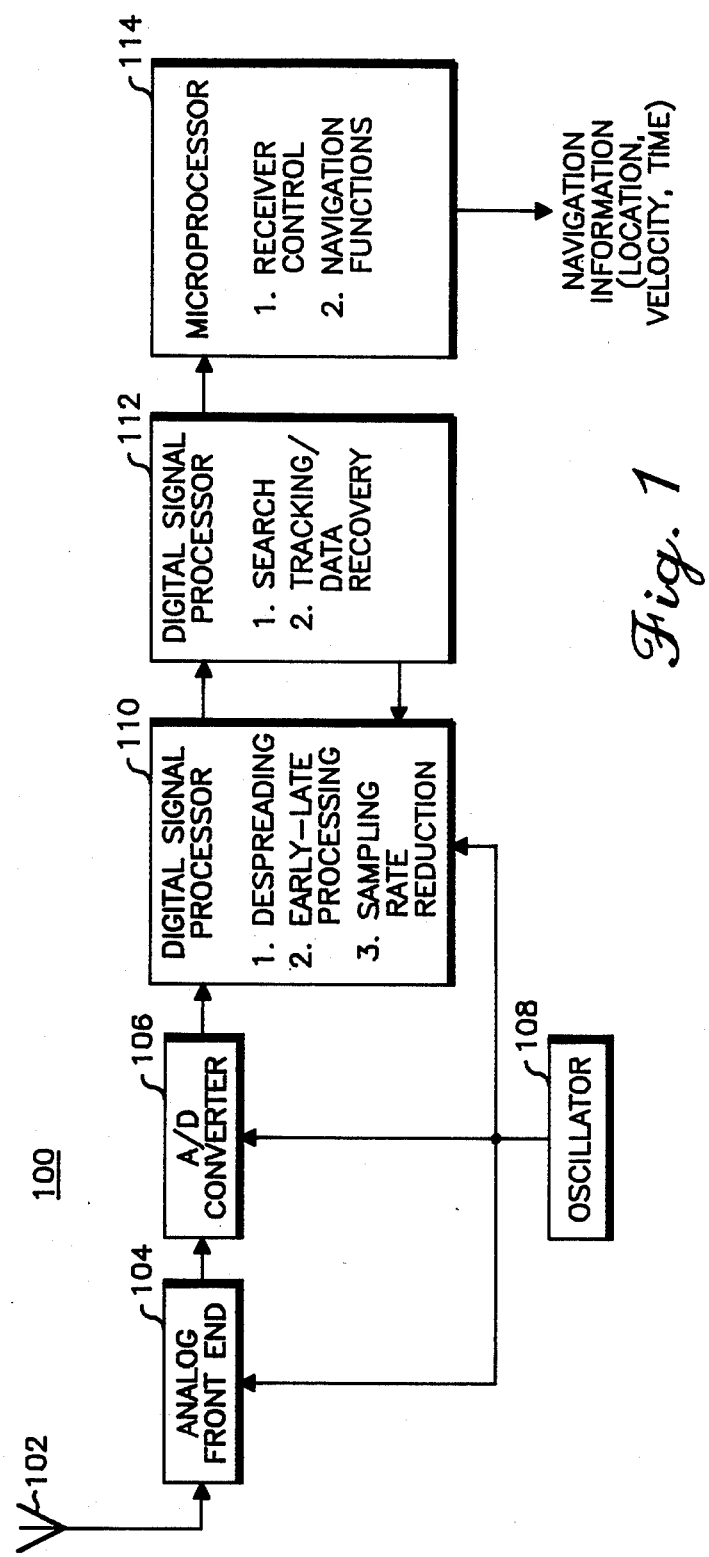
FIG. 1 is a block diagram showing the architecture of the GPS receiver of the present invention.

FIG. 1 is a block diagram showing the architecture of the digital GPS receiver of the present invention. The receiver 100 includes an antenna 102 coupled to an analog front-end 104, for the purpose of receiving and selecting the desired composite GPS signal (comprising signals from several satellites) at the L1 frequency and for modifying the signal such that it is suitable for conversion to digital (binary) form. This signal modification includes filtering, amplification, and frequency translation. The analog front-end 104 is coupled to A/D converter 106 which samples and converts the received analog signal to the digital form required for subsequent receiver processing. An oscillator 108, coupled to analog front-end 104 and to A/D converter 106, supplies a clock signal at an appropriate sampling frequency. In the context of the present invention, this clock frequency is to be carefully chosen, as will be discussed further below. In the preferred embodiment of the invention, the clock frequency is approximately 38.192 MHz.

The output of A/D converter 106 is coupled to a first digital signal processor (DSP) 110. The DSP 110 provides quadrature mixing to approximately zero frequency, C/A code generation and despreading, early-late processing for deriving auxiliary signals for delay-locking, lowpass filtering, and sample rate reduction. According to the principles of the present invention, the DSP 110 processes received signals from 4 satellites simultaneously. Oscillator 108 is also coupled to DSP 110, and supplies the clock signal at the fundamental sampling frequency. First DSP 110 operates at a relatively high speed, owing to the high sample rate of the digitized signal supplied by A/D converter 106. However, in spite of the high operating speed, and in spite of the large amount of processing required, the operations of DSP 110 may be simplified, in accordance with the principles of the present invention, to such an extent that DSP 110 is readily adaptable to implementation in a single monolithic integrated circuit (IC).

First DSP 110 is coupled to a second DSP 112 which performs signal search, tracking, and data recovery operations. The DSP 112 also performs signal processing for four channels simultaneously. These operations include Costas loop carrier recovery and demodulation, delay locked-loop filtering and C/A code delay control, data bit synchronization and data detection, and FFT-aided spectral power measurement for search. Owing to the relatively slow sample rate of the signals supplied by first DSP 110 (by virtue of the lowpass filtering and sample rate reduction performed therein), the operations of second DSP 112 are readily implemented using general-purpose, programmable DSP IC's which are readily available from a number of manufacturers.

Second DSP 112 is coupled to a microprocessor ($\mu$P) system 114, which handles overall receiver control and navigation functions. These functions include interpretation of data messages and other parameters measured by DSP 112 (e.g., code delays and Doppler frequencies), navigation fix computations, and selection of the four satellites to be tracked. Microprocessor 114 also performs, in conjunction with second DSP 112, an improved search algorithm to be described in more detail below. The functions of $\mu$P 114, with the exception of the improved search algorithm of the present invention, are typical of those performed by other GSP receiver back-end $\mu$P's, and will not be further elaborated. An example of the operation of the back-end microprocessor 114 is disclosed in an article by Borel M. J., et al., *Texas Instruments Phase I GPS User Equipment*, THE INSTITUTE OF NAVIGATION: THE GLOBAL POSITIONING SYSTEM, pp. 87–102, 1980. Details of a navigation fix algorithm in particular may be found in an article by Noe, P. S. and Myer, K. A., *A Position Fixing Algorithm for the Low-cost GPS Receiver,* IEEE TRANSACTIONS ON AEROSPACE AND ELECTRONIC SYSTEMS, AES-12, Vol. 2,, pp 295–297, March 1976.

Figure 2:
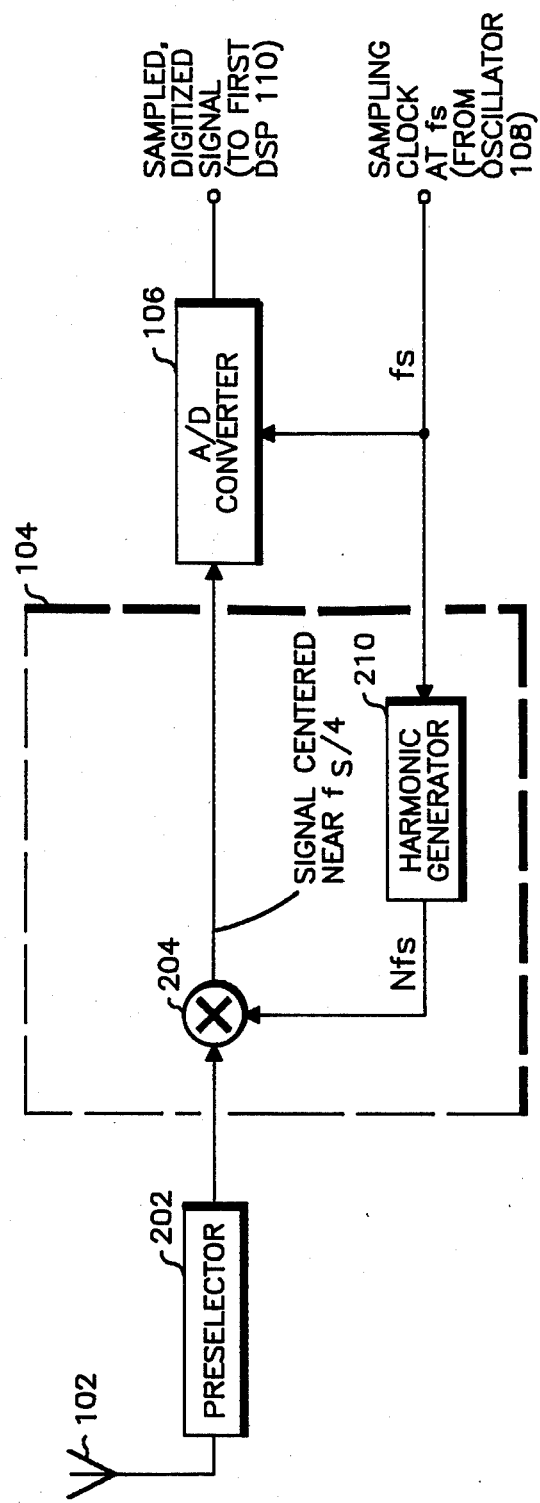
FIG. 2 is a detailed block diagram of the analog front end 104 of FIG. 1, and showing connections to the antenna and A/D converter.

FIG. 2 shows a more detailed block diagram of analog front-end 104. Analog front-end 104 includes a preselector 202 coupled to antenna 102, for the purpose of selecting and amplifying the desired composite GPS signal. Signal selection is accomplished by the preselector which incorporates a bandpass filter approximately centered at the L1 frequency of 1575.42 MHz. The parameters of the filter (bandwidth and number of poles) are chosen as a compromise between the conflicting requirements of a good interference rejection and low signal distortion, as is well understood in the art. In the present invention, which is directed to reception of GPS C/A signals, a three-pole filter with a 3 dB bandwidth of 6 MHz is adequate. Those skilled in the art will appreciate that ceramic filters are particularly well suited for use as a preselector in the context of the present invention.

The output of preselector 202 is coupled to one input of an analog mixer 204. The second input of analog mixer 204 is coupled to the output of harmonic generator 210, which supplies a substantially sinusoidal signal exhibiting a frequency equal to N times the sampling frequency $f_s$. The input of harmonic generator 210 is coupled to oscillator 108, which supplies a clock signal at frequency $f_s$, whose harmonic is to be generated. Harmonic generator 210 may be realized using any of several standard techniques, for example, a step recovery diode may be used as a pulse generator, which is followed by bandpass filtering to pick off the desired (Nth) harmonic.

According to the method of the invention, the sampling rate $f_s$ and the harmonic number N are chosen so as to satisfy the following relationship:

$$f_{L1} = 1575.42 \text{ MHz} = (N + / - 0.25) \cdot f_s$$

If this is satisfied, then the difference-frequency signal appearing at the output of mixer 204 will be approximately centered at the frequency $f_s/4$, which will be explained in more detail below. Thus, the combination of harmonic generator 210 and mixer 204 act to frequency-translate the incoming signal from a carrier frequency of 1575.42 MHz to a carrier frequency equal to approximately $f_s/4$. In the preferred embodiment of the present invention, N=41, $f_s$=38.192 MHz, and the plus (+) sign in the above equation is used. In this case, the GPS signal is translated to approximately 9.548 Mhz.

The output of mixer 204 is coupled to the analog input port of an analog-to-digital (A/D) converter 106. Oscillator 108, also coupled to an A/D converter 106, supplies a clock signal which causes the A/D to sample, and digitize the input waveform at the sampling rate $f_s$. The multi-bit digital output of A/D converter 106 is coupled to DSP 110 for further processing. In order to avoid the need for a separate sample-and-hold circuit, A/D converter 106 is preferably of the "flash" variety. Several flash A/D converters are available off-the-shelf from various manufacturers. For example, the TDC1029 6-bit A/D converter available from TRW may be utilized. TRW LSI Products Division, TRW Electronic Components Group, P.O. Box 2472, La Jolla, CA 92038.

The quantization noise introduced by A/D converter 106 adds to the antenna and other front-end noises produced by preselector 202 and mixer 204. It is desirable to adjust the gain of preselector 202 so that this quantization noise does not significantly degrade the overall front-end noise figure. The resolution (number of bits) of A/D converter 106 should be chosen to provide adequate dynamic range for the types of signals that will be received, including desired GPS signals and interferers. In the preferred embodiment of the present invention, a 6-bit converter is utilized. The sampling rate $f_s$ must be large enough to provide adequate protection against aliasing, in accordance with the Nyquist sampling theorem. As stated previously, a sampling rate of 38.192 MHz satisfies this criterion, as well as the relational constraint described above.

Figure 3:
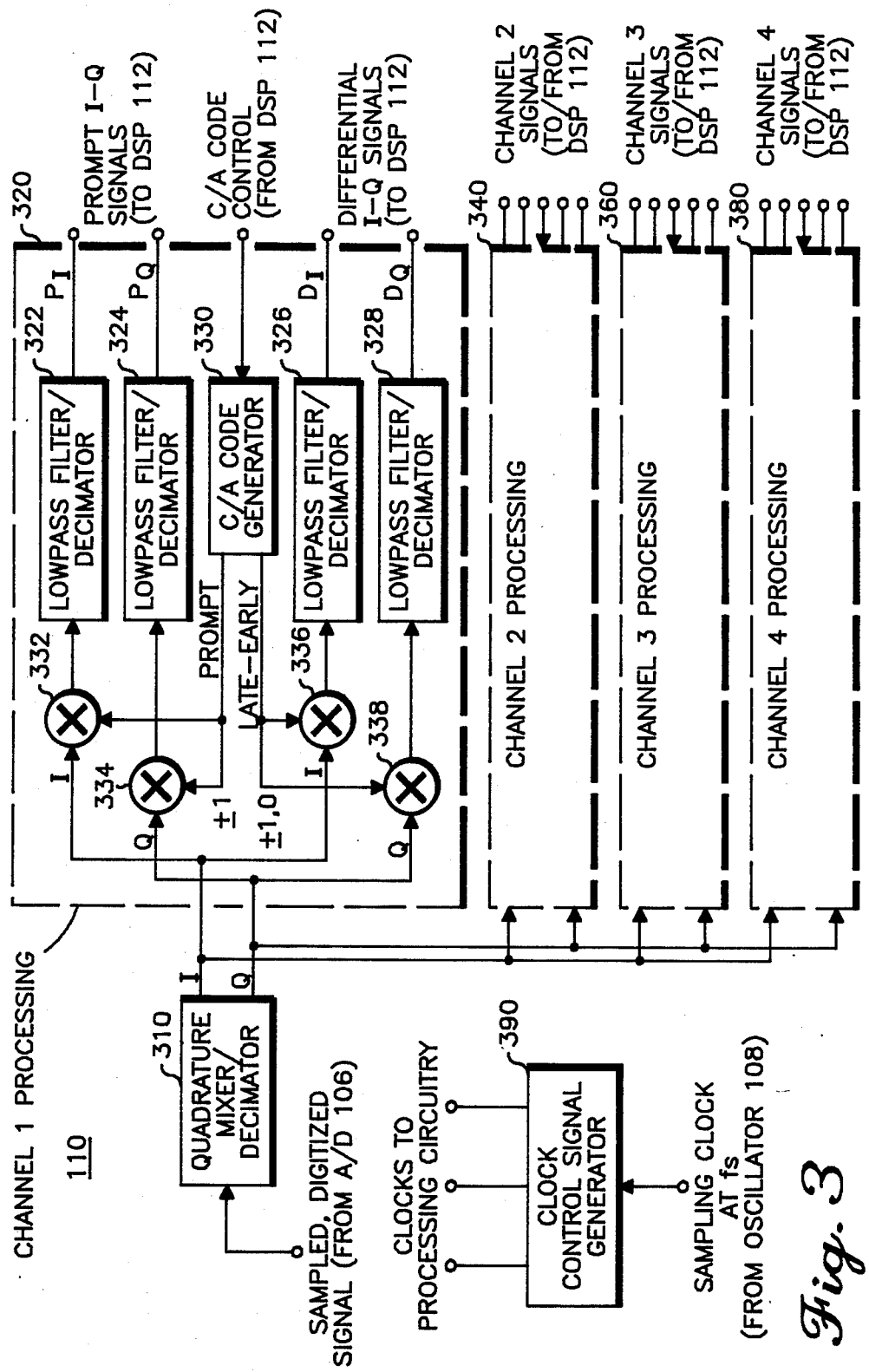
FIG. 3 is a detailed block diagram of the first DSP section 110 of the GPS receiver of FIG. 1.

Note that analog front-end 104 represents a very minimal amount of circuitry, in contrast to the analog sections of prior receivers. This has significant beneficial implications with regard to manufacturability, and immunity of receiver performance to environmental variations. The output of A/D converter 106 is coupled to first DSP 110, which is depicted in FIG. 3. DSP 110 includes a quadrature mixer/decimator 310, coupled to A/D converter 106, which accepts as input the sampled, digitized composite GPS signal comprising C/A signals from nominally four satellites, plus front-end noise. Mixer/decimator 310 performs quadrature mixing to translate the composite signal by $f_s/4$, from a center frequency of approximately $f_s/4$, down to a carrier frequency of approximately zero Hz. Although translation to zero Hz is not strictly necessary, it is preferred since it simplifies subsequent processing. After this frequency translation, mixer/decimator 310 performs very simple lowpass filtering, followed by sampling rate reduction, or "decimation". The quadrature mixer/decimator 310 will be discussed in more detail below in conjunction with FIGS. 4a and 4b.

As is well known in the art, quadrature mixing produces complex number-type outputs with two components: an in-phase (I) component, and an out-of-phase or quadrature (Q) component. The I and Q outputs of quadrature mixer/decimator 310 are each coupled to four channel processing units 320, 340, 360, and 380, corresponding to channels 1, 2, 3, and 4, respectively. These processing units perform code despreading and related tasks for four satellite signals. Processing units 320, 340, 360, and 380 are identical in structure; hence, only the workings of channel 1 processor 320 will be described.

Channel processor 320 includes a C/A code generator 330, which produces two signals: (1) a "prompt" signal, which is a duplicate of the C/A code of the desired satellite, and (2) a "late-early" signal, which is defined as one-half the arithmetic difference of the prompt signal delayed (late) by a time interval $T_d$, and the prompt signal advanced (early) by $T_d$. In mathematical terms, if the prompt signal is denoted by P(t), then the late-early signal is:

$$LE(t) = \{P(t - T_d) - P(t + T_d)\}/2$$

Since the prompt signal is a C/A code and hence takes on the values of +1 and −1, the late-early signal can be seen to take on the three values +1, −1, and 0. Code generator 330 can be designed according to standard techniques; C/A code generation is fully described, for example, in Air Force document SS-GPS- 300B, *System Specification for the NAVSTAR Global Positioning System.* The required signals may be obtained by passing the basic C/A code through a shift register, which is tapped at the input, center, and output to provide the early, prompt, and late signals, respectively. The time interval $T_d$ is chosen to yield the desired delay-discriminator characteristic, or "S-curve", as is well-known in the art. Typically, $T_d$ is approximately one-half the duration of a chip, or in this case about 0.5 microseconds, since the C/A code chip rate is 1.023 Mchips/sec. The control input of C/A code generator 330 is coupled to second DSP 112, which transmits instructions as to which of the 18 possible C/A codes is to be generated, and as to the desired timing relationship (code delay) between the generated code and the code of the received satellite signal.

The prompt output of C/A code generator 330 is coupled to one input each of multipliers 332 and 334. The second inputs of multipliers 332 and 334 are coupled to the I and Q outputs, respectively, of quadrature mixer/decimator 310. Assuming proper-time alignment, multipliers 332 and 334 effectively perform despreading, or removal of the C/A code, from the signal whose code matches that produced by C/A code generator 330. Thus, assuming proper time-alignment, the I-Q signal appearing at the output of multipliers 332, 334 is a 50 bit/sec data signal. The carrier frequency of this data signal is typically not exactly zero Hz, rather, it varies from zero Hz according to the Doppler shift caused by satellite and user movement, and by drift of oscillator 108 from its nominal frequency. For typical land users, the Doppler shift due to satellite and user movement amounts to about +/−2.7 parts-per-million (ppm). Assuming an oscillator drift of +/−2.0 ppm, the total Doppler shift is typically +/−4.7 ppm, or about +/−7.5 kHz with the nominal L1 carrier frequency of 1575.42 MHz. Since the I-Q signal at the output of multipliers 332, 334 is known to lie within the frequency range −7.5 kHz to +7.5 kHz, it may be lowpass filtered to remove unwanted noise outside that band. In turn, the sampling rate of the signal may be reduced in accordance with Nyquist's sampling theorem. These are the functions of lowpass filter/decimators 322 and 324, whose inputs are coupled to the outputs of multipliers 332 and 334, respectively. The PI and PQ (prompt I and Q) signals, output from lowpass filter/decimators 322 and 324, respectively, are coupled to DSP 112 for further processing.

Figure 6A:
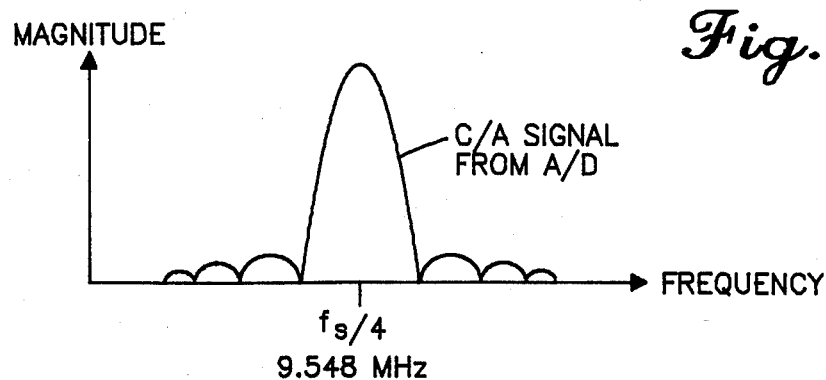
FIG. 6a is a spectral plot of a C/A signal at the output of A/D converter 106.
Figure 6B:
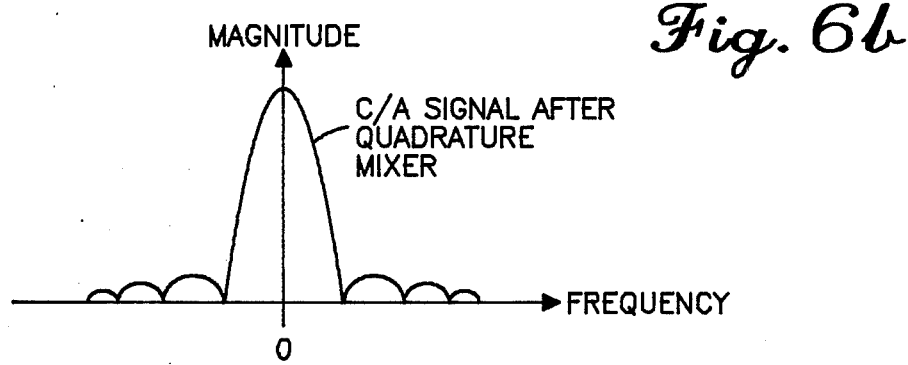
FIG. 6b is spectral plot of a C/A signal at the output of quadrature mixer/decimator 310.
Figure 6C:
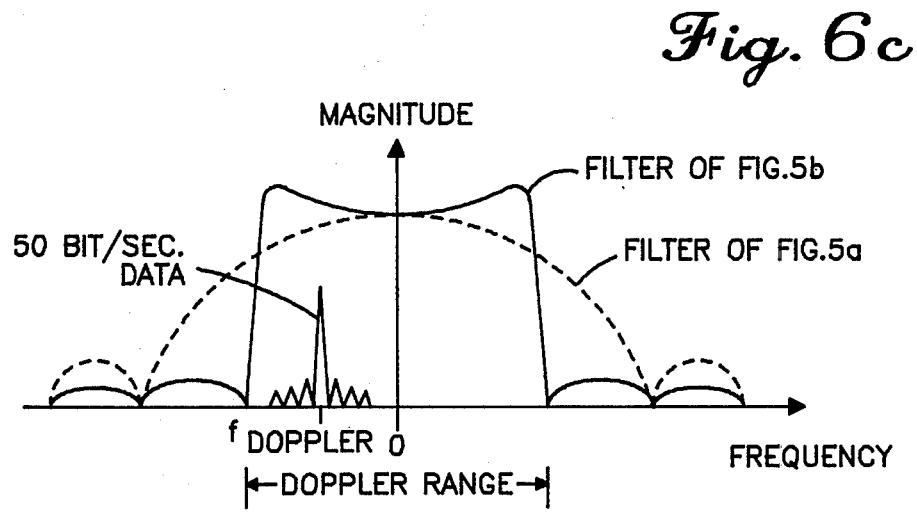
FIG. 6c is a spectral plot of a despread data signal, and in relation thereto, the responses of the filters of FIGS. 5a and 5b.

FIGS. 6a, 6b, and 6c show the magnitude spectra of a GPS C/A signal as it is processed through DSP 110. FIG. 6a shows the one-sided spectrum of a C/A signal input from A/D converter 106. It exhibits a (sin x/x) type response with the first nulls located approximately 1 MHz from the center frequency of $f_s/4$ (9.548 Mhz in the preferred embodiment). This shape is due to the C/A code, whose chip rate is 1.023 MHz. FIG. 6b shows the spectrum of the translated I-Q signal appearing at the output of quadrature mixer/decimator 310. The spectrum of an I-Q signal is formed, in general, by taking the Fourier transform of a complex signal whose real part is the I signal, and whose imaginary part is the Q signal. Note that the translated C/A signal is centered at approximately zero carrier frequency.

FIG. 6c shows the spectrum of the prompt I-Q signal after despreading. Note that the spectral spreading caused by C/A code modulation has been removed, leaving the 50 bit/sec data signal centered at the Doppler offset frequency.

Referring again to FIG. 3, the late-early output of C/A code generator 330 is coupled to one input each of multipliers 336 and 338. The second inputs of multipliers 336 and 338 are coupled to the I and Q outputs, respectively, of quadrature mixer/decimator 310. The I-Q signal appearing at the output of multipliers 336, 338 is an auxiliary "differential" signal which is utilized later in the receiver for delay locking. As with the prompt I-Q signal, the important content of the differential I-Q signal is confined in frequency to the range of possible Doppler offsets, that is, to the band between −7.5 kHz and +7.5 kHz, roughly. Identical lowpass filter/decimators 326 and 328, coupled to the outputs of multipliers 336 and 338, respectively, remove unwanted energy outside this band, and reduce the sampling rate accordingly. The DI and DQ (differential I and Q) signals, output from lowpass filter/decimators 326 and 328, respectively, are coupled to DSP 112 for further processing. Filters 326 and 328 are identical to prompt filters 322 and 324.

As mentioned previously, channel processors 340, 360, and 380 are identical in structure to channel processor 320. During normal operation, each processing unit separates, from the received composite signal, the particular satellite signal whose C/A code matches that produced by that unit's code generator.

A clock/control generator 390 is provided as part of DSP 110 for generating clock and control signals required by the various digital processing circuitries. Oscillator 108, coupled to clock/control generator 390, provides the basic clock signal from which the other clock and control signals are derived. The architecture of the GPS receiver of the present invention has been designed so that the circuitry of DSP 110 is amenable to realization of a single monolithic integrated circuit. This is chiefly due to the fact that complicated, multi-bit digital multiply operations, which are typically necessary in digital signal processing, are avoided throughout. As is well-known in the art, multi-bit multiplications (e.g., multiplication of two 8-bit numbers) are quite costly in terms of circuit area, power supply current consumption, and execution time. This is especially true at high operating speeds or sampling rates, such as are required in a GPS receiver. Multi-bit multiplications are avoided in DSP 110 by several methods. First, recall that the prompt signal supplied to multipliers 332 and 334 exhibits only the values +1 and −1, and that the late-early signal supplied to multipliers 336 and 338 exhibits only the values +1, −1, and 0. Those skilled in the art will appreciate the ease with which multiplication by such simple factors may be implemented. Only a few logic gates are needed per bit of word length of the I and Q signals being multiplied. The C/A code generator 330 contains no multipliers, and may be easily configured using gates and flip-flops, as shown in the document cited above. Multi-bit multipliers may be eliminated from lowpass filter/decimators 322, 324, 326, and 328 by the use of special filter structures, as will be explained later. Finally, such multipliers are avoided in quadrature mixer/decimator 310 by virtue of several architectural features of the receiver of the present invention, including a special choice of quadrature mixing frequency, which will now be discussed.

Recall that the main function of quadrature mixer/decimator 310 is to translate the composite signal input from the A/D converter down to zero frequency. In general, quadrature mixing is performed by multiplying the signal to be translated by cos $W_0t$ and sin $W_0t$, where $W_0$ is the desired amount of radian frequency translation. Mathematically, this may be thought of as multiplying by the complex quantity exp $\{jW_0t\}$=cos $W_0t+j$ sin $W_0t$, and regarding the real and imaginary part of the product as the I and Q outputs, respectively. In a digital implementation, the cosine and sine waveforms are sampled, i.e., the time variable t becomes the discrete time variable nT, where $T=1/f_s=1/$sampling rate, and n is a sample count integer (1, 2, 3, 4, ... etc.) With regard to circuitry, the digital implementation requires some means to generate the cosine and sine values, such as a ROM table, plus two multiplier circuits. In general, for good performance the cosine and sine values must be accurately represented in a substantial number of bits, which means that the cosine/sine multipliers are necessarily of the complicated multi-bit variety.

Multi-bit multipliers and cosine/sine generation circuitry are avoided in the quadrature mixer of the present invention by a special choice of translation frequency. Recall that the composite signal input from A/D converter 16 is centered approximately at the frequency $f_s/4$, by virtue of the previously-described constraint specifying the relation between the sampling frequency $f_s$ and the harmonic generaor parameter N. Thus, to translate the composite signal to zero frequency from $f_s/4$, the translation frequency $W_0$ must be $2\pi f_s/4$. This means that the sampled complex mixing waveform exp $\{W_0t\}$ becomes exp $\{jn\pi/2\}$, which is simply of the form ... 1, j, $-1$, $-j$, 1, j, $-1$, $-j$, ... etc. The sampled cosine and sine waveforms are thus simplified to ... 1, 0, $-1$, 0, and ... 0, 1, 0, $-1$, respectively. Those skilled in the art will appreciate the ease of generation of such simple sequences, and of multiplication therewith. In particular, the necessity for complicated multi-bit multiplier circuits is eliminated.

The above-described simplification of the quadrature mixing operation is made possible fundamentally by an architectural feature of the GPS receiver of the present invention. All known GPS receivers perform carrier demodulation, or Doppler removal, either prior to, or in association with, despreading. Such an approach, if adopted in a digital receiver, would imply quadrature mixing to exactly zero Hz, rather than to approximately zero Hz, as is the case with the present invention. That is, the translation frequency would be, instead of $f_s/4$, $f_s/4 + f_{Doppler}$. Since the Doppler frequency is generally different for each satellite signal, this would necessitate four separate quadrature mixing operations. More importantly, the special relationship between the translation frequency and sampling rate would be destroyed, eliminating the possibility of simplifying the mixing waveforms and avoiding multi-bit multiplier circuits. By contrast, the receiver of the present invention performs carrier demodulation after despreading, in fact, after the filtering and decimation operations which follow despreading. This partitioning of functions allows carrier demodulation to be performed in DSP 112 using programmable DSP IC's, which are well-suited to the tasks of waveform generation and multi-bit multiplication. It also makes possible the above-mentioned simplifications, allowing quadrature mixer/decimator 310 to be easily implemented, as will now be described.

Figure 4A:
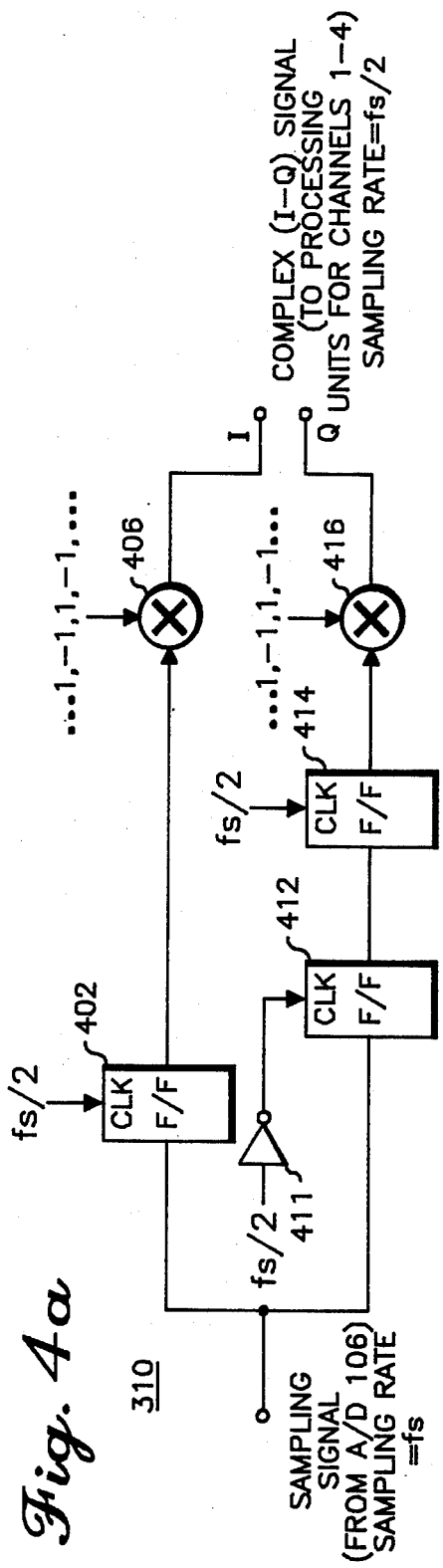
FIGS. 4a and 4b are schematic diagrams of alternate embodiments of quadrature mixer/decimator 310 of FIG. 3.
Figure 4B:
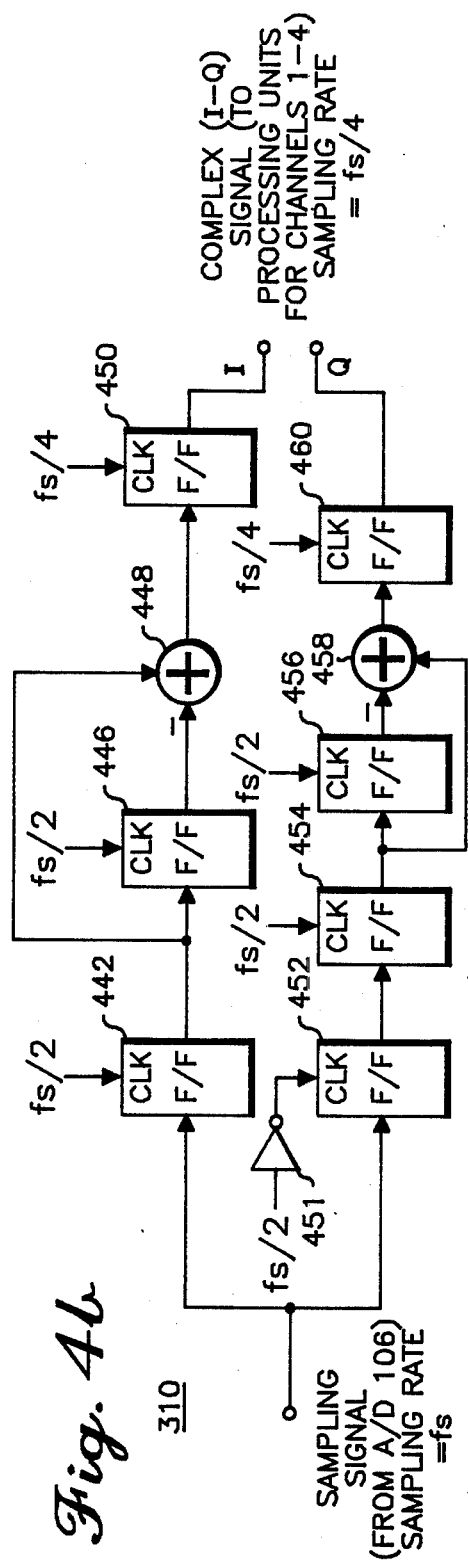

FIGS. 4a and 4b show two alternate embodiments of quadrature mixer/decimator 310. Both embodiments perform quadrature mixing by the complex sequence ... 1, j, $-1$, $-j$, ... etc., followed by simple filtering and decimation operations. The filtering is performed to remove the negative-frequency image of the composite GPS signal, which is centered at the frequency $f_s/2$ after the quadrature mixing process. Since the signal bandwidth is reduced by such filtering, sampling rate reduction (decimation) is also performed to allow subsequent circuitry to operate at lower speed. The circuit of FIG. 4a effectively performs quadrature mixing followed by a 2-tap digital lowpass filter (z-transform transfer function $H(z)=1+z^{-1}$) and decimation by 2. The circuit of FIG. 4b in effect performs quadrature mixing followed by a 4-tap lowpass filter (transfer function $H(z)=1+z^{-1}+z^{-2}+z^{+3}$) and decimation by 4.

The embodiment of quadrature mixer/decimator 310 of FIG. 4a includes two multi-bit flip-flops or latches 402 and 412 (denoted F/F), each coupled to A/D converter 106, for the purpose of latching the multi-bit signal samples emanating from the A/D and separating the sample sequence into two alternating half-rate sequences. Flip-flops 402 and 412 are both provided clock signals of frequency $f_s/2$. However, the clock signal for flip-flop 412 is 180 degrees out-of-phase with that for flip-flop 402, so that while flip-flop 402 latches even-numbered input samples, flip-flop 412 latches odd-numbered samples (or vice versa). The clock phase inversion may be conveniently implemented by, for example, inverter 411. Flip-flop 414, coupled to the output of flip-flop 412 and provided the same clock signal as flip-flop 402, acts to time-align the two sample streams. Multipliers 406 and 416, coupled to the outputs of flip-flops 402 and 414, respectively, mix each stream with alternating $+/-1$ sequences. Multipliers 406 and 416 can be easily implemented due to the simple nature of the factors $+1$ and $-1$. The outputs of multipliers 406 and 416 represent the I and Q outputs, respectively, of quadrature mixer/decimator 310, and are coupled to channel processing units 320, 340, 360, and 380 for further processing. The sample rates of the I and Q outputs are reduced by half from that at the input, down to $f_s/2$ (19.096 MHz in one receiver embodiment).

The embodiment of quadrature mixer/decimator 310 of FIG. 4b includes flip-flops 442, 452, and 454, and inverter 451, connected in a manner identical to that of circuits 402, 412, 414, and 411 of FIG. 4a, and producing the same effect. That is, circuits 442, 452, 454, and 451 serve to latch the sampled signal coming from A/D 106, and to separate it into two synchronized, half-rate sample streams. One sample stream, appearing at the output of flip-flop 442, is coupled to flip-flop 442, is coupled to flip-flop 446. Flip-flop 446 is provided the same clock as is flip-flop 442 (at frequency $f_s/2$), and provides a delay of one sample period. Subtractor 448 subtracts the delayed samples appearing at the output of flip-flop 446 from the undelayed samples appearing at the output of flip-flop 442. The output of subtractor 448 is latched by flip-flop 450 at the rate $f_2/4$, as instructed by a clock signal at frequency $f_s/4$. Every second output of subtractor 448 is thus discarded. Identical processing is performed on the sample stream output from flip-flop 454, by flip-flops 456 and 460 and subtractor 458. The outputs of flip-flops 450 and 460 represent the I and Q outputs, respectively, of quadrature mixer/decimator 310, and are coupled to channel processing units 320, 340, 360, and 380 for further processing. The sample rates of the I and Q outputs are reduced by one quarter from that at the input, down to $f_s/4$ (9.548 MHz in one receiver embodiment). Note that this rate is one-half that provided by the circuit of FIG. 4a, allowing subsequent circuitry to operate at a lower rate. Although somewhat more complex, the circuit of FIG. 4b would be preferred over that of FIG. 4a for realizations where processing speed or power consumption is critical.

The foregoing discussion describes how the operations of quadrature mixer/decimator 310 may be substantially simplified, allowing for easy implementation. Attention is now turned to the post-despreading lowpass filter/decimators 322, 324, 326, and 328. Digital filters in general require three types of components: (1) latches or flip-flops, which provide delay, (2) adders, or in some cases subtractors, and (3) multipliers. Multipliers are used to multiply the signal samples flowing through a digital filter by various gain constants, which control the filter's transfer function, or frequency response. The multiplier complexity depends on the signal sample and gain coefficient word lengths. The signal word length affects the dynamic range and signal-to-noise performance of the filter. The coefficient word length affects the the degree to which the filter's frequency response can be made to approximate some desired response. Coarse coefficient quantization (i.e., short coefficient word length) is desirable from an implementation standpoint, but can cause substantial distortion of the response in some filter structures. This is especially true if the passband of the response is very narrow compared to the sampling frequency, as is the case here. To overcome this problem, the receiver of the present invention employs special filter structures which allow the coefficients to be very coarsely quantized, to such an extent that multiplier circuits are eliminated entirely.

Figure 5A:
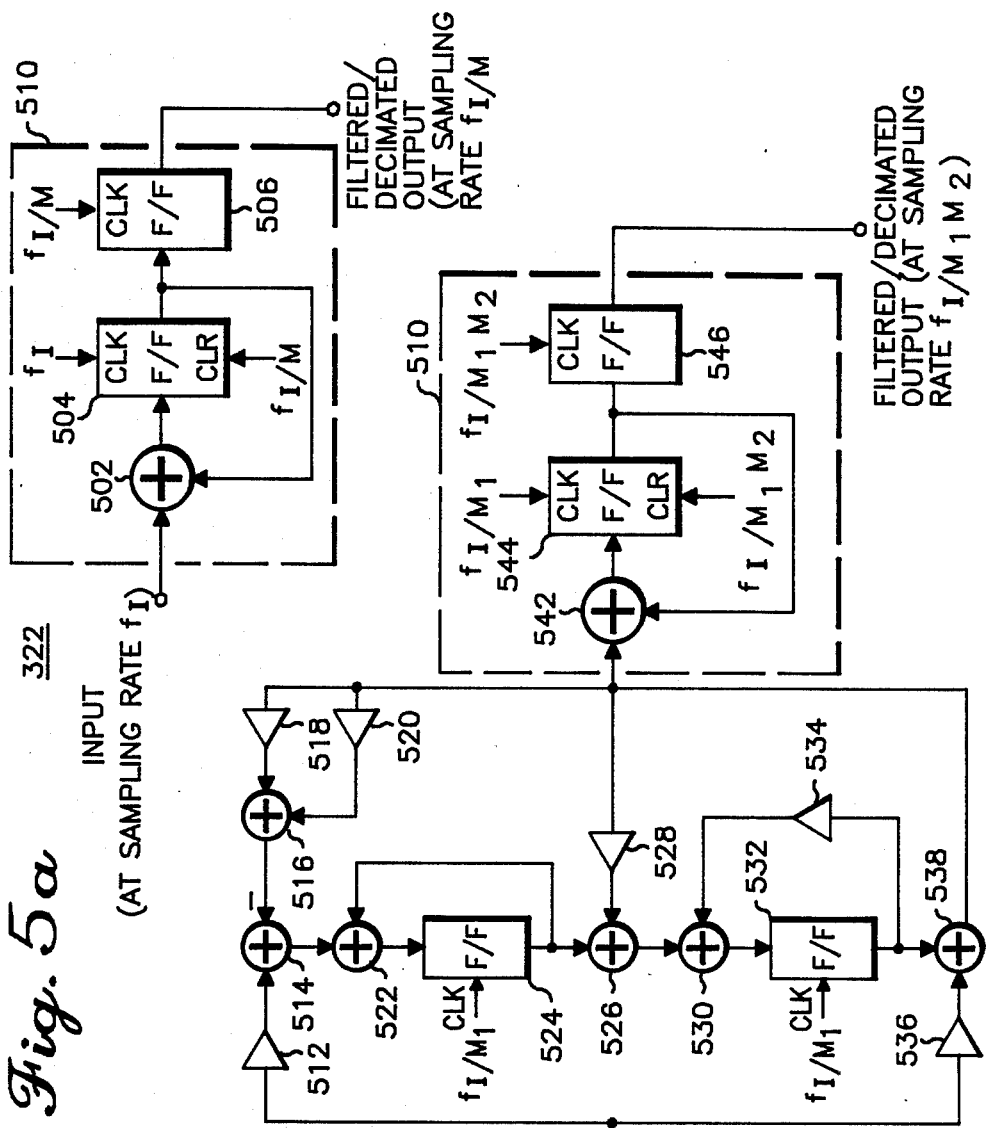
FIGs. 5a and 5 b are schematic diagrams of alternate embodiments of lowpass filter/decimator 322 of FIG. 3.
Figure 5B:
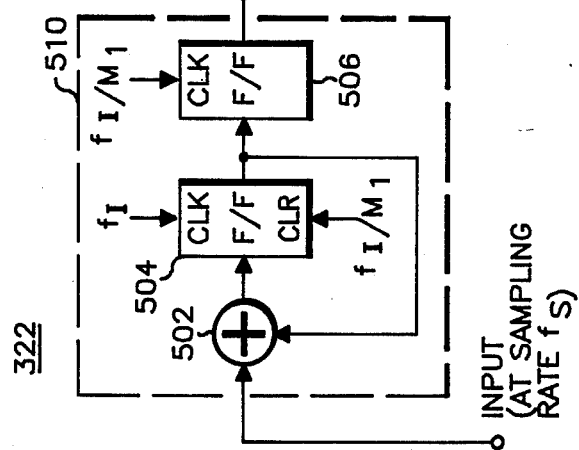

FIGS. 5a and 5b detail two alternate embodiments of multiplierless digital filters which may be used as the lowpass filter/decimator 322 (and also 324, 326, and 328, since they are identical). Circuit 510 of FIG. 5a can basically be described as an M-sample sum-and-dump filter. As is well known in the art, the function of such a filter (also called an integrate-and-dump) is to, for every set of M consecutive input samples, form the sum of the samples and output the result. This is equivalent to a finite impulse response (FIR) filter with M equal gain coefficients, whose output is sampled once for every M input samples (decimation by M). This function may be conveniently implemented by circuit 510, which comprises an accumulator formed by binary adder 502 and latch or multi-bit flip-flop 504, and an output latch 506. Input samples, arriving at sampling rate $f_I$, are summed by adder 502 into accumulator latch 504, which is clocked at the same rate $f_I$. After M input samples have been summed, the result of that sum, appearing at the output of latch 504, is saved by (or "dumped" into) output latch 506, which is provided a clock at the decimated sampling rate $f_I/M$. The output of latch 506 is the lowpass filtered output signal whose sampling rate has been desirably reduced by the factor M, to $f_I/M$. Accumulator latch 504 is also provided with a clear, or reset, signal at the rate $f_I/M$, which causes it to be cleared to an all-zero state after each M-sample sum has been formed and output to latch 506. The accumulator is thus readied for summation of the next M input samples. In the context of the present invention, the input sampling rate $f_I$ is equal to either $f_s/2$ or $f_s/4$, depending on whether the circuit of FIG. 4a, or that of FIG. 4b, is utilized for quadrature mixer/decimator 310. Thus, if $f_s$ is 38.192 MHz, $f_I$ is either 19.096 MHz or 9.548 MHz.

The magnitude vs. frequency response of sum-and-dump 510 exhibits a sin (x/x) shape centered at zero frequency, an example of which is shown in FIG. 6c. For a given input sampling rate $f_I$, the bandwidth of the filter is controlled by the parameter M, with the first stopband null appearing at the frequency $f_I/M$. The bandwidth should be chosen as a compromise between the conflicting requirements for (1) low signal-to-noise ratio (SNR) degradation for despread data signals within the Doppler range $+/-7.5$ kHz (implying large bandwidth), and (2) low output sampling rate, so that the processing burden on DSP 112 is minimized (implying narrow bandwidth).

Although simple to implement (no multipliers), a sum-and-dump filter possesses somewhat undesirable response characteristics, namely, a rather rounded passband, and a stopband which rolls off rather slowly with frequency. These characteristics make for somewhat degraded performance compared to that of more elaborate filters. The ideal filter for this application would be a rectangular or "brick-wall" filter with a cutoff frequency equal to the maximum expected Doppler shift of about 7.5 kHz. Although not practicality realizable, such a filter would allow the output sampling rate to be reduced down to about 15 kHz, without causing the SNR degradation normally produced by noise aliasing and signal attenuation. By contrast, a sum-and-dump filter designed for the same output sampling rate introduces SNR degradations of up to 3.9 dB, with the worst degradation occuring for signals at the Doppler limits. For most GPS receiver applications this level of degradation is intolerable. Therefore, in most cases sum-and-dump 510 would be designed with a wider bandwidth, the penalty, of course, being a higher output sampling rate and a larger processing burden imposed on DSP 112.

In cases where the SNR/output sampling rate tradeoff allowed by sum-and-dump 510 is insufficient, an alternate filter embodiment of the type shown in FIG. 5b may be employed. The filter of FIG. 5b exhibits a frequency response more closely approaching that of an ideal filter, yet is easily implemented as it contains no multiplier circuits. Briefly, lowpass filter/decimator 322 of FIG. 5b can be described as the cascade of an M1-sample sum-and-dump, a second order multiplierless recursive filter with two poles and two zeroes, and an M2-sample sum-and-dump. The overall filter may be viewed as an M1M2-sample sum-and-dump which has been split into two sections, between which a 2nd order recursive section is placed which acts to "square up" the passband response and improve the stopband attenuation. Sampling rate reduction, or decimation, is accomplished in two stages, first, by the factor M1 by the first sum-and-dump, and again by the factor M2 by the second sum-and-dump, yielding an overall decimation factor of $M1 \times M2$. This two stage decimation allows the second and third filter sections to operate at a reduced clock rate, thereby reducing power consumption.

In detail, lowpass filter/decimator 322 of FIG. 5b includes a first sum-and-dump section 510, which accepts input samples arriving at sampling rate $f_I$ (either $f_s/2$ or $f_s/4$, as discussed above), and performs sum-and-dump operations identical to those described above, except that the parameter M is now M1. Filtered samples appearing at the output of first sum-and-dump 510 at the sampling rate $f_I/M1$ are passed to the 2nd order recursive filter section. This section is made up of latches or multi-bit flip-flops 524 and 532; gain units 512, 518, 520, 528, 534, and 536; adders 516, 522, 526, 530, and 538; and subtractor 514. The input samples arriving from the first sum-and-dump are coupled to gain units 512 and 536. The recursive section operates at the rate $f_I/M1$, as determined by the clock signal at frequency $f_I/M1$ applied to latches 524 and 532. The filtered output is taken from the output of adder 538, which is coupled to the input of the second sum-and-dump section at adder 542. The second sum-and-dump section, formed by adder 542, accumulator latch 544, and output latch 546, operates in a manner identical to that of the first sum-and-dump section, except that the input sampling rate is $f_I/M1$, and the decimation parameter is now M2. The output of latch 546 represents the final lowpass filtered and decimated result, which exhibits a sampling rate of $f_I/M1/M2$.

The structure of the 2nd order recursive section has been chosen so that gain units 512, 518, 520, 528, 534, and 536 may be implemented without using multipliers. The structure is of a type especially suited for narrowband lowpass filters wherein the gain coefficients may be coarsely quantized without causing excessive frequency response distortion. Such a structure is discussed, for example, in the article, *New Recursive Digital Filter Structures Having Very Low Sensitivity and Roundoff Noise*, IEEE TRANSACTIONS ON CIRCUITS AND SYSTEMS, Vol. CAS-22, No. 12, pp. 921-927 December 1975. In the filter of the present invention the process of coefficient quantization has been taken to the limit, i.e., the coefficients have been quantized to "one bit". Thus each gain coefficient is, in fact, a power of two. Those of ordinary skill in the art will realize that to implement a power-of-2 gain in binary arithmetic requires only a simple bit-shifting operation. In practice, this bit-shifting can be implemented by an appropriate routing of data lines. Thus, no hardware per se is needed to implement the gain units. This facilitates the overall filter implementation, as it is reduced to simply a combination of adders and latches.

The values of the gain coefficients and the decimation parameters M1 and M2 should be chosen to yield good SNR performance and an output sampling rate as close as possible to the ideal low value of 15 kHz. As an example, in one embodiment the design parameters are as shown below in Table 1.

TABLE 1

| Amplifier | Gain |
|---|---|
| 512 | ¼ |
| 518 | ¼ |
| 520 | 1/16 |
| 528 | 1/16 |
| 534 | ½ |
| 536 | ½ |

Where M1=112, M2=5

With an input sampling rate $f_I$ equal to 9.548 MHz, as provided by the quadrature mixer/decimator circuit of FIG. 4b with $f_s = 38.192$ MHz, the final output sampling rate is 17.05 kHz, which is quite close to the minimum 15 kHz rate. The z-transform of the transfer function of the second order recursive section is given by:

$$H(z) = \frac{z^2 - 1.5z + 1}{z^2 - 1.5625z + .875}$$

where $1/z$ corresponds to a delay of 1/85.25 kHz.

The magnitude vs. frequency response of the overall filter is shown in FIG. 6c. Compared to the response of the simple sum-and-dump filter it exhibits a more rectangular aspect with improved stopband rejection. Accordingly, the SNR performance is improved considerably. By virtue of first decimation by M1=112, the sampling rate of the recursive and second sum-and-dump sections is a desirably low 85.25 kHz.

As is well known in the art, the word lengths of the binary representations of signals flowing through a digital filter must be long enough so that the noise introduced by the filter itself is not excessive. Analysis shows that a signal word length of 16 bits is sufficient for either of the embodiments of lowpass filter/decimator 322 described above, assuming that A/D converter 106 is a 6-bit converter.

Figure 7:
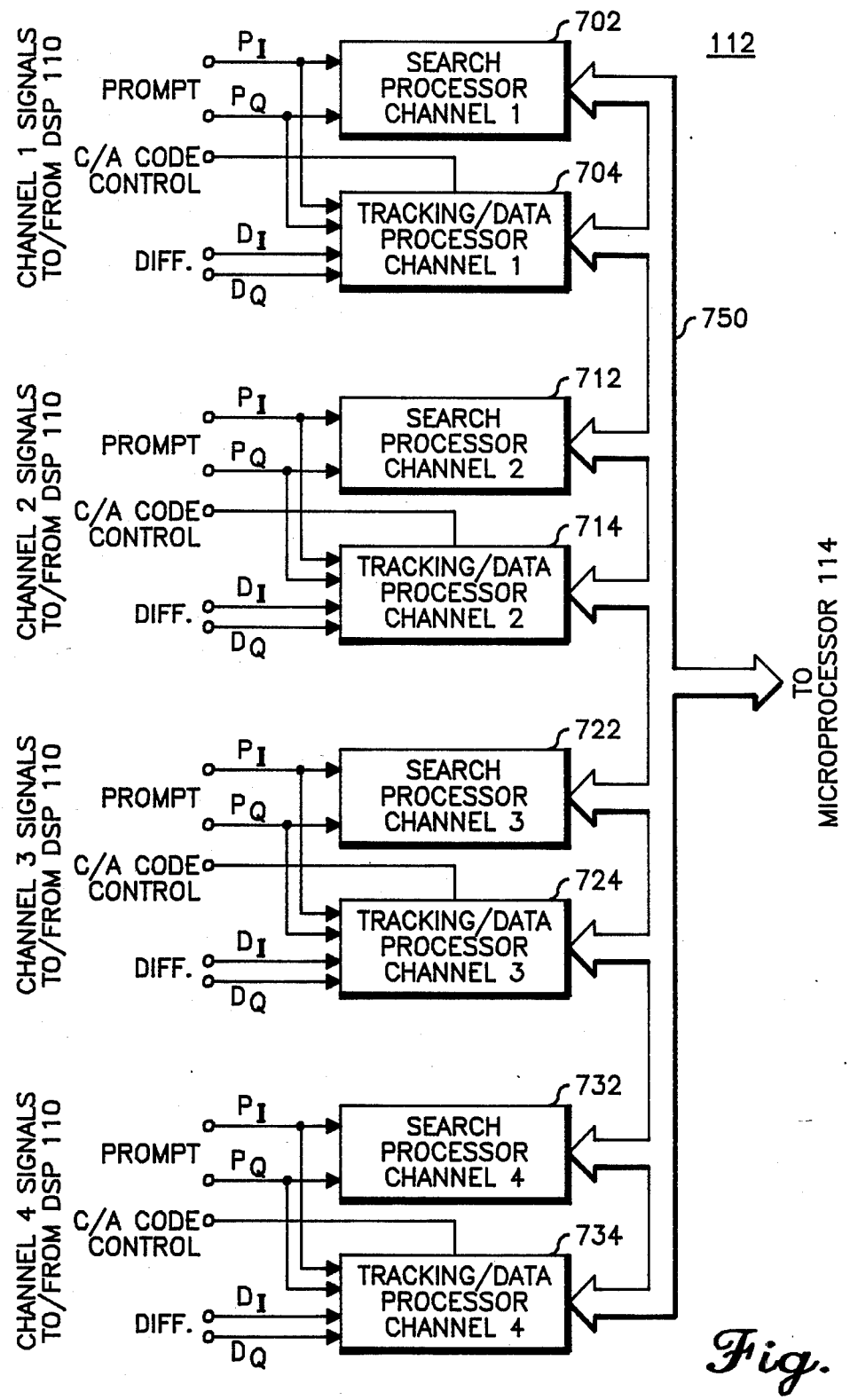
FIG. 7 is a detailed block diagram of the second DSP section 112 of FIG. 1.

Attention is now turned to the architecture and operations of DSP 112, a block diagram of which is shown in FIG. 7. In the preferred embodiment, DSP 112 includes, for each of four parallel channels, a search processor and a tracking/data processor. The search and tracking/data processors for each channel are coupled to the corresponding channel processing unit of DSP 110. For example, channel 1 processors 702 and 704 are coupled to channel 1 processing unit 320 of DSP 110. In detail, the channel 1 prompt signals PI and PQ, output from lowpass filter/decimators 322 and 324, are each coupled to search processor 702 and to tracking/data processor 704. The channel 1 differential signals DI and DQ, output from lowpass filter/decimators 326 and 328, are each coupled to tracking/data processor 704. The channel 1 C/A code control signal, output from tracking/data processor 704, is coupled to C/A code generator 330. Similar connections are made between channel 2 processors 712 and 714 and processing unit 340 of DSP 110; between channel 3 processors 722 and 724 and processing unit 360 of DSP 110; and between channel 4 processors 732 and 734 and processing unit 380 of DSP 110. All eight search and tracking/data processors are coupled to control microprocessor 114 via the bidirectional data bus 750.

Figure 8:
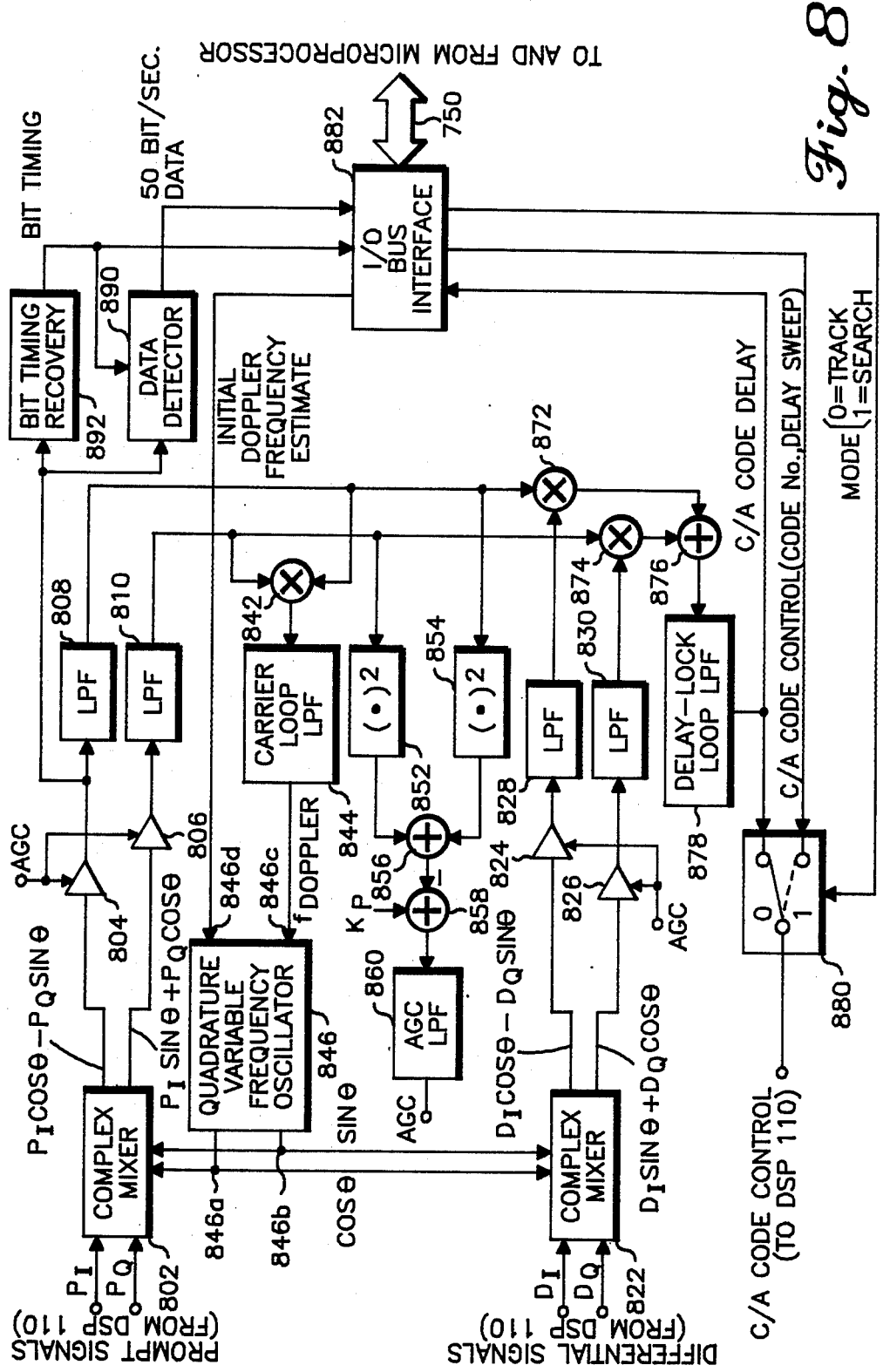
FIG. 8 is a detailed block diagram of the operations performed by tracking/data processor 704 of FIG. 7.

FIG. 8 shows in detail the basic operations performed by tracking/data processors 704, 714, 724, and 734. Briefly, each processor provides Costas loop carrier recovery and carrier demodulation (Doppler removal), delay-locked loop processing for C/A code delay control, automatic gain control (AGC), and data bit timing recovery and data detection. An input/output (I/O) bus interface is also included to facilitate communication with microprocessor 114.

Costas loop carrier recovery and carrier demodulation are performed by the loop comprising complex mixer 802, lowpass filters 808 and 810, mixer 842, carrier loop lowpass filter 844, and quadrature variable frequency oscillator (VFO) 846. Prompt I and Q signals, PI and PQ, arriving from DSP 110 are coupled to one input port of complex mixer 802. The other input port of complex mixer 802 is coupled to the output of a quadrature variable frequency ocillator (VFO) 846, which supplies sampled cosine and sine waveforms at the negative of the recovered carrier (i.e., Doppler) frequency. These signals are denoted cos $\phi$ and sin $\phi$, and appear at outputs 846a and 846b, respectively, of quadrature VFO 846. In effect, complex mixer 802 performs a complex multiplication of the two "complex" signals PI+jPQ and cos $\phi$+j sin $\phi$. The product resulting from this multiplication comprises two output signals: an in-phase ("real") component {PI cos $\phi$−PQ sin $\phi$}, and a quadrature ("imaginary") component {PI sin $\phi$+PQ cos $\phi$}. These signals are applied to AGC amplifiers 804 and 806, respectively, which serve to scale the signals to a relatively constant average power level, thereby mitigating the effects of signal fading. The derivation of the AGC control signal will be described shortly. The outputs of AGC amps 804 and 806 are coupled to lowpass filters (LPF's) 808 and 810, which act to improve the loop signal-to-noise ratio (SNR). The outputs of LPF's 808 and 810 are multiplied together by mixer 842, and the product is applied to carrier loop LPF 844. The output of loop filter 844 is the recovered carrier frequency, $f_{Doppler}$, which is coupled to the frequency control input 846c of quadrature VFO 846.

The control loop thus formed may be viewed as a Costas loop, or as a complex-valued squaring loop operating at zero frequency. Such loops are well understood by those skilled in the art. One Costas loop which would function satisfactorily in conjunction with the GPS receiver of the present invention is shown and described in a text by Holmes, *Coherent Spread Spectrum Systems*, Wiley Interscience 1982, pp. 121–207. In the locked condition, the "complex" sinusoidal output of quadrature VFO 846 closely follows the incoming prompt signal in phase and frequency (actually the negative of said phase and frequency). Thus the output of complex mixer 802 represents the fully demodulated data signal, centered substantially at zero Hertz, with zero phase angle. In practice, the bandwidths of the identical "arm" filters 808 and 810 are adjusted for the best loop SNR performance consistent with the dynamic tracking requirements of the loop. Carrier loop filter 844 is also designed with tracking requirements in mind. It preferably includes an integrator so that the phase may be tracked with zero error for any Doppler frequency. Quadrature VFO 846 may be conveniently implemented using a standard ROM lookup table technique, described, for example, in the article "A Digital Frequency Synthesizer", by J. Tierney, C. Rader, and B. Gold, in IEEE Transactions on Audio and Electroacoustics, Vol. AU-19, No. 1, March 1971, pp. 48–56.

When the carrier recovery loop is locked, the in-phase demodulated signal appearing at the output of amplifier 804 is the baseband 50 bit/sec data signal ready for detection. This signal is coupled to bit timing recovery block 892 and data detector 890. The output of bit timing recovery unit 892 is a bit timing signal synchronized to the transition instants of the received data signal. This bit timing signal is applied to data detector 890, instructing the detector as to the optimum timing of bit decisions. The output of data detector 890 is the recovered satellite navigation message, which is sent to microprocessor ($\mu$P) 114 via I/O bus interface 882. The bit timing information is also sent to $\mu$P 114 via bus interface 882 for use in navigation calculations. The workings of bit timing recovery unit 892 and data detector 890 will be well understood by those skilled in the art. Bit timing circuits and data detector circuits are generally described in a a test by Holmes, *Coherent Spread Spectrum Systems*, Wiley Interscience 1982, pp. 564–620.

The differential signals arriving from DSP 110 are processed in a manner similar to that performed on the prompt signals, in order to provide C/A code delay locking. In-phase and quadrature differential signals DI and DQ are input to one port of complex mixer 822. The other input port of the mixer is provided the cosine and sine outputs of quadrature VFO 846. Complex mixer 822 operates in a manner identical to prompt complex mixer 802, and produces in-phase and quadrature output signals [DI cos $\phi$ − DQ sin $\phi$] and {DI sin $\phi$ + DQ cos $\phi$}. The in-phase and quadrature outputs of complex mixer 822 are scaled by AGC amps 824 and 826, and then lowpass filtered by filters 828 and 830. Filters 828 and 830 are identical to prompt path filters 808 and 810. The in-phase prompt and differential signals output from filters 808 and 828, respectively, are multiplied together by mixer 872. The corresponding quadrature signals output from filters 810 and 830 are multiplied by mixer 874. The products of mixers 872 and 874 are summed by adder 876, whose output is coupled to delay-locked loop (DLL) lowpass filter 878. The signal output from DLL filter 878 represents the receiver-derived estimate of relative C/A code delay, which is sent to $\mu$P 114 for navigation calculations, via bus interface 882 and bus 750. The code delay signal is also sent via switch 880 (position 0) to the code control input of the appropriate C/A code generator of DSP 110.

The delay-locked loop thus formed by the tracking processor of FIG. 8 operating in conjunction with DSP 110 is known as a modified noncoherent code tracking loop. Such a loop is described, for example, in the article "A Modified PN Code Tracking Loop: Its Performance Analysis and Comparative Evaluation", by R. Yost and R. Boyd, in IEEE Transactions of Communications, Vol. COM-30, No. 5, May 1982, pp. 1027–36. For the present invention, the loop described in the article has been adapted to operate at zero frequency in a complex-number (I-Q) fashion. The loop dynamic response is controlled by DLL filter 878, which preferably includes an integrator so that the delay may be tracked with zero steady-state error for any Doppler shift.

In order to maintain, at a constant level, the dynamic characteristics of the various receiver tracking loops (carrier, delay, and bit timing), the tracking processor of present invention is provided with AGC. An AGC control signal is derived using squarers 852 and 854, adder 856, subtractor 858, and AGC lowpass filter 860. The in-phase and quadrature output signals of filters 808 and 810 are applied to squarers 852 and 854, respectively. The squares of the two signals are calculated, and then summed by adder 856. The output of adder 856 represents the instantaneous power of the I-Q signal output from LPF's 808 and 810. A constant Kp, corresponding to the desired average power level, is added to the negative of the sum output by adder 856, by subtractor 858. The output of subtractor 858 represents a power "error" signal, which is filtered by AGC lowpass filter 860. Filter 860 preferably contains a perfect integrator. The output of AGC filter 860 is the AGC control signal, which is coupled to AGC amps 804, 806, 824, and 826. The AGC loop thus formed acts to maintain, at the constant level Kp, the average power of the post-arm filter I-Q signal. The bandwidth of AGC filter 860 determines the dynamic response of the AGC loop, and should be chosen in accordance with the characteristics of expected signal strength variations.

The above described operations pertain to the tracking/data processor as operated in a "track" mode. During the search procedure (to be described shortly) which precedes tracking, the tracking/data processor is configured to operate in a "search" mode. This is accomplished by $\mu$P 114, which sets switch 880 to position 1. With switch 880 in position 1, the tracking/data processor simply acts to relay code control information input from $\mu$P 114 (via bus 750 and bus interface 882) to the C/A code generator of DSP 110. This information includes the code number (i.e., which of the 18 satellite codes is to be generated) and the C/A code delay, which is incremented, or swept, during search. In the search mode, tracking and data detection operations may essentially be idled. Upon completion of search, μP 114 sets switch 880 to position 0, and sends an initial Doppler frequency estimate (obtained during search) to quadrature VFO 846 via input port 846d. The tracking process then begins.

The tracking/data detection operations shown in FIG. 8 may be conveniently implemented using off-the-shelf, programmable DSP IC's. The possibility of such an implementation is enhanced when the sampling rates of the signals input from DSP 110 are minimized. A sampling rate of 17.05 kHz for the PI, PQ, DI, and DQ signals is sufficiently low to allow each of the tracking-/data processors 704, 714, 724, and 734 of DSP 112 to be implemented using one IC. A suitable DSP IC is the μPD7720 manufactured by NEC (NEC Electronics U.S.A., One Natick Executive Park, Natick, Mass. 01760).

Modifications or additions to the tracking/data detection operations shown in FIG. 8 may occur to those skilled in the art. Such additions might include lock detectors for the various loops, or the outputting of additiional information to μP 114, for example, signal strength and Doppler frequency. A major advantage of a programmable implementation is that the processing operations may be easily and flexibly modified to accommodate the requirements of different receiver applications.

Figure 9A:
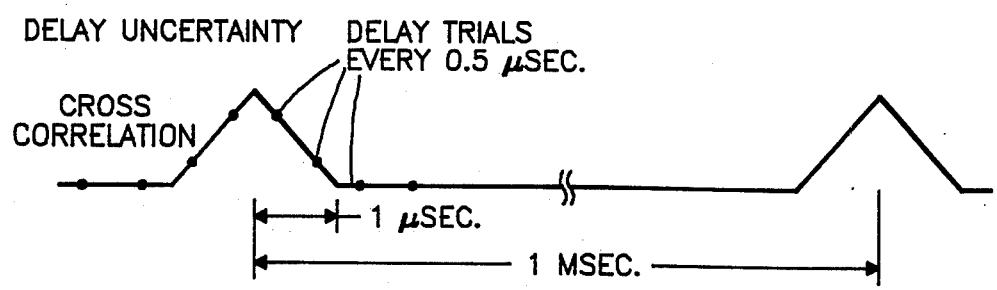
FIGS. 9a, 9b, and 9c illustrate the problem of searching for a GPS C/A signal over many code delays and Doppler frequencies.
Figure 9B:
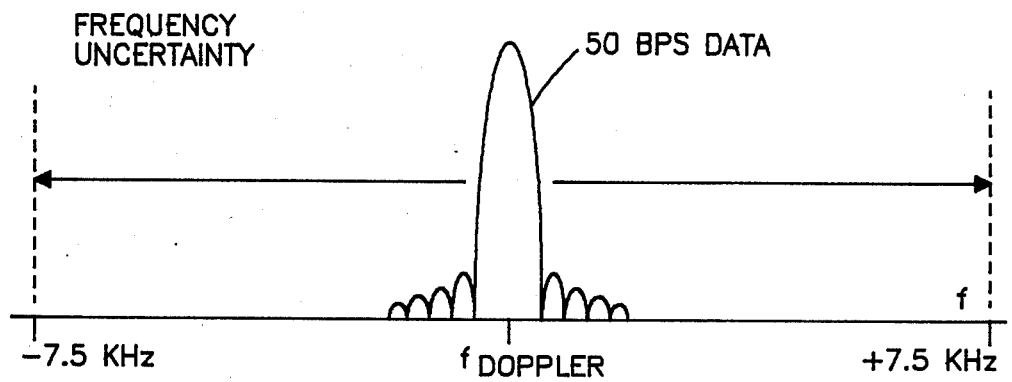
Figure 9C:
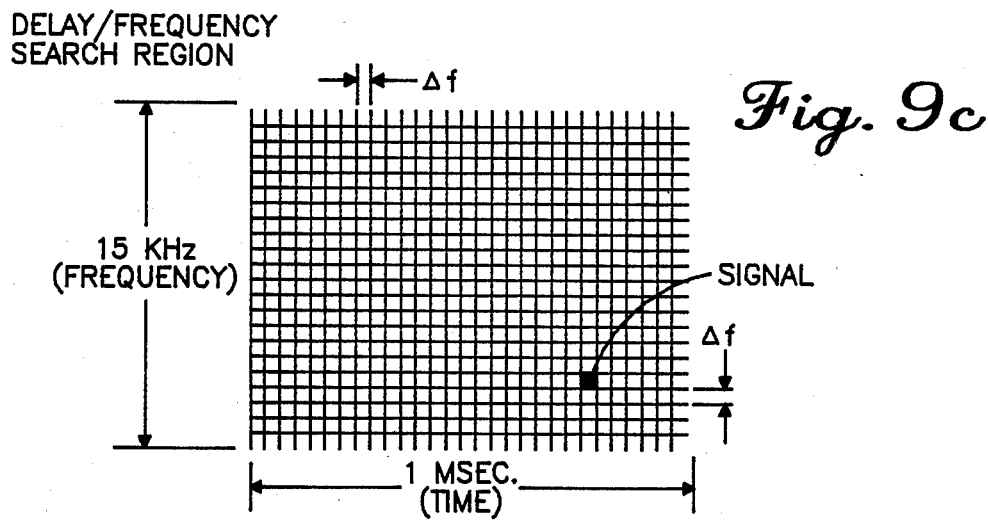

As alluded to in the background discussion, before signal tracking and data detection may begin, each satellite signal must be searched for and acquired. FIGS. 9a, 9b, and 9c illustrate the problem of searching for a GPS C/A coded signal. FIG. 9a shows the cross correlation between a received C/A signal and a locally generated C/A code, as a function of C/A code delay. This is equivalent to the relative magnitude of a despread (prompt) data signal as code delay is varied. The cross correlation essentially exhibits a triangular shape two chip periods (about 2 μsecs) wide at the base, which appears once every C/A code period (1023 chips or 1 millisec). The desired operating point is at the peak of the triangle, where despread signal power is maximum. Normally, upon receiver startup the correct code delay is uncertain, i.e., the location of the correlation triangle is unknown. To find the correct code delay, the receiver typically sweeps or increments through all possible code delays until a high despread signal level is detected. Delay trials are usually spaced about a half chip period (5 μsec) apart, so that the correlation peak is not substantially missed.

FIG. 9b illustrates a second dimension of the search problem, the frequency uncertainty. When correctly despread, the C/A coded signal is collapsed down to simply a 50 bit/sec data signal. The carrier frequency of this data signal is uncertain, due to the Doppler shift produced by satellite motion and receiver clock drift. In the present receiver, which operates at essentially zero frequency, the carrier frequency of the despread (prompt) signal may vary between +7.5 kHz and −7.5 kHz. Filtering, provided by the lowpass filter/decimators of DSP 110, is used to remove noise outside this band. However, the signal-to-noise ratio within this bandwidth is still not sufficient to allow for reliable detection of the signal, nor to allow for locking of the tracking loops. Accordingly, to improve the SNR, further filtering must be performed which breaks the Doppler frequency range into several narrower bands, each of which is checked for signal presence.

FIG. 9c summarizes graphically the two-dimensional nature of the search process. The desired signal may be viewed as lying at some point within a two-dimensional search space, whose dimensions are time (code delay) and frequency (Doppler). To locate the signal, the space is divided into many smaller sub-units, or bins, of dimensions $\Delta t$ by $\Delta f$, each of which is checked for presence of signal. Typically, to allow for reliable detection, $\Delta t$ is about 0.5 μsec, and $\Delta f$ is on the order of 1 kHz or less. Since the total dimensions of the space are 1 msec by 15 kHz, the total number of search bins is on the order of 30,000.

Most prior receivers perform search in a sequential manner, examining each bin in the search space one-at-a-time. The usual procedure is for the receiver to make a guess as to the correct code delay, setting the C/A code generator accordingly. Then, for that code delay, all frequency bins are examined for presence of signal. If no signal is found, the code generator is incremented to the next code delay and the process is repeated. The detection method typically employed in checking for signal presence can be loosely described as a variable-frequency average power "meter" followed by a threshold decision. For a given code delay/Doppler frequency trial, the C/A signal is multiplied by the locally generated C/A code, and mixed with a sinusoid whose frequency is equal to the current Doppler guess. The resultant signal is filtered by a filter whose bandwidth is commensurate with the frequency search interval $\Delta f$. If the desired signal is present in the bin being searched, the output of said filter will contain a despread 50 bit/sec data signal. The output of the filter is squared and averaged to obtain the average power, which is then compared to a threshold. If the average power is greater than the threshold, the signal is deemed present in the current bin. Otherwise, the signal is deemed absent, and the search proceeds to the next bin. A search technique which typifies a conventional practice is described in a paper by Spilker, J. J., Jr., *Global Positioning System: GPS Signal Structure and Performance Characteristics*, THE INSTITUTE OF NAVIGATION, Vol. 1, pp. 29–54, 1980.

Due to the large number of bins to be searched (around 30,000), conventional receivers require many minutes to find a signal if a sequential search method is employed. Additional time may be incurred if the identities (i.e., codes) of the satellites within view of the receiving antenna are unknown. Methods to shorten the search time have been devised but are quite expensive to implement. Generally, these are based on the idea of examining several code delays simultaneously for each Doppler frequency in order to speed up the process. For example, one technique employs multiple despreading circuits, each with its own code generator and average power detector, operating in parallel.

The receiver of the present invention employs an improved search technique, which has been developed in conjunction with the overall receiver architecture. Briefly, the technique involves the use of a Fast Fourier Transform (FFT) aided average power detector, which allows all Doppler frequency bins to be examined simultaneously for each code delay trial, thereby drastically reducing search time. Most or all of the required processing may be conveniently implemented using programmable DSP IC's.

In one embodiment, the FFT-aided search procedure is implemented using search processors 702, 712, 722, and 732 of DSP 112 operating in conjunction with microprocessor 114. In this embodiment, overall search control is provided by μP 114, and the bulk of the processing, including FFT calculations, is performed by the search processors.

In summary, the improved search method works as follows. For a given code delay trial, search processor 702 (or equivalently, processor 712, 722, or 732) inputs, upon command from μP 114, blocks of N prompt sample pairs (PI, PQ) from DSP 110. For each block of N I-Q sample pairs, a complex discrete Fourier transform (DFT) is performed using an N-point FFT. In effect, the FFT accomplishes complex mixing of the I-Q sample stream by N complex sinusoids whose frequencies are equally spaced across the Doppler range, followed by lowpass filtering and decimation of each product signal. The N mixing and filtering operations are performed simultaneously, in a highly efficient manner, by the FFT. In practice, the filtering is equivalent to an N-sample sum-and-dump. Decimation by N is thus performed inherently by the FFT on each of the filtered product signals. Therefore, for each block of N I-Q input samples, there are N complex, or I-Q, output samples, each corresponding to a different frequency bin. The power of these N FFT outputs is then found and averaged. The N powers are found by forming the squared-magnitude of each complex output (i.e., the sum of the squares of the real and imaginary, or I and Q, components). The N power quantities are then averaged over M FFT's.

At the conclusion of the average power measurement, processor 702 determines the largest of the N power quantities, and passes this value, along with the corresponding frequency bin number, to μP 114. Microprocessor 114 compares this maximum power to a threshold. Depending on the result of this comparison, search either ends or proceeds to the next code delay, as in conventional search procedures.

In effect, the improved search method described above implements N average power detectors, operating in parallel, for N frequencies spread evenly across the entire range of possible Doppler frequencies. Since N frequency bins are checked simultaneously for each code delay trial, the required search time is reduced by the factor N compared to conventional sequential search procedures. The frequency resolution Δf obtained is equal to the sampling rate of the I-Q sample pairs input from DSP 110, divided by N. If the input sampling rate is denoted $f_{iq}$, then the frequency resolution is $\Delta f = f_{iq}/N$, and the frequency range covered is from $-f_{iq}/2$ to $+f_{iq}/2$. The FFT parameter N should be chosen to provide adequate frequency resolution, and to allow for convenient FFT implementation (since FFT complexity, e.g., memory requirements, depends on N). The averaging parameter M and the threshold value affect various detector characteristics, such as the probabilities of detection and noise falsing, as is well understood in the art.

Figure 10:
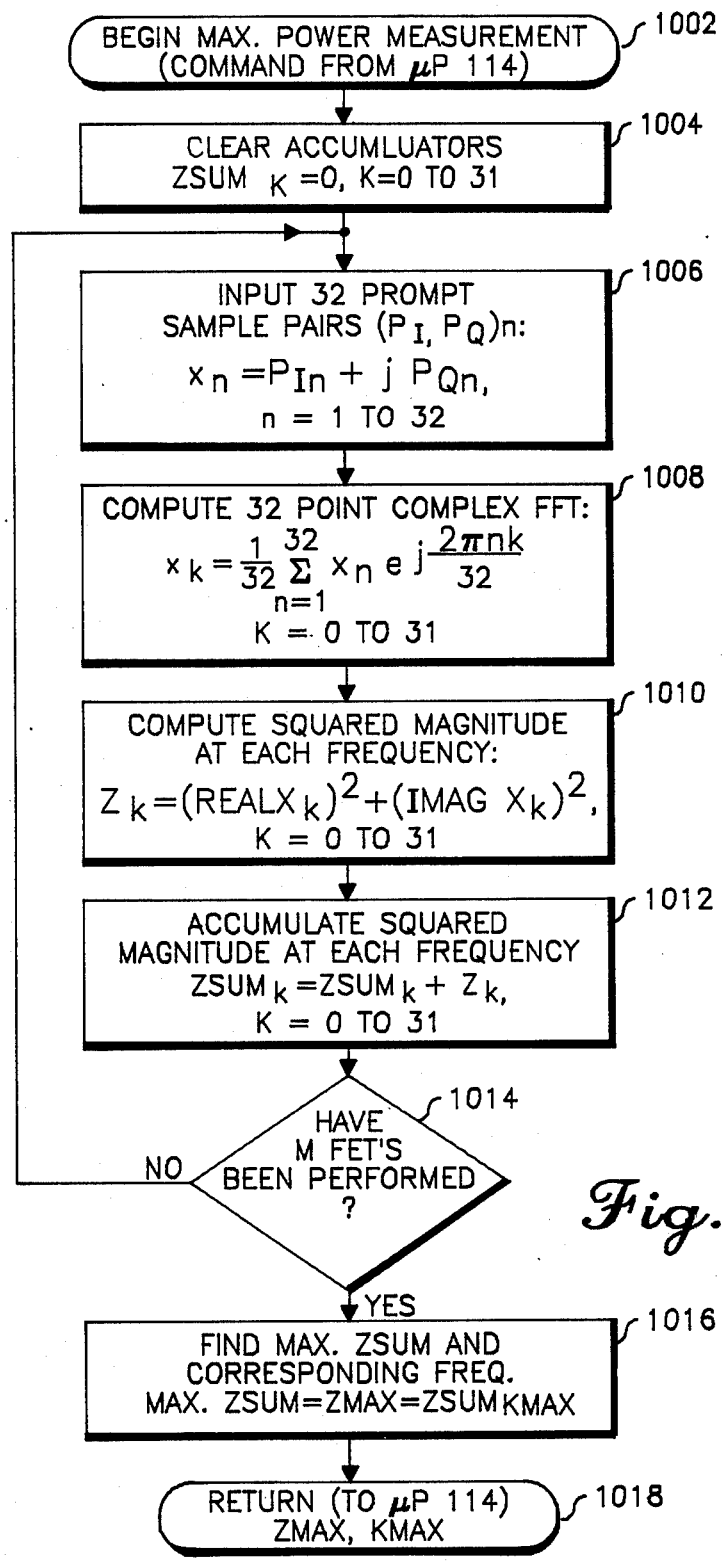
FIG. 10 is flow diagram of the FFT-aided maximum spectral power measurement performed by search processor 702 of FIG. 7 in accordance with the method of the invention.

A flow diagram, outlining a suitable procedure for the maximum power measurement performed by search processor 702, is shown in FIG. 10. The procedure may be advantageously implemented using a programmable DSP IC, such as the μPD7720 manufactured by NEC, as mentioned above. In this embodiment, the FFT parameter N is equal to 32. For an input sampling rate of 17.05 kHz, the frequency resolution Δf is 533 Hz, and the range of frequencies covered is from −8.525 KHz to +8.525 KHz.

The maximum power measurement is initiated at item 1002 upon command from μP 114 (via but 750). The first step, carried out in item, or sub-routine, 1004, is to clear the 32 power averaging accumulators ZSUM(k), k=0 to 31, to zero. Next, an input sub-routine 1006, 32 consecutive prompt sample pairs (PI, PQ) are input from DSP 110 and stored in memory. These I-Q sample pairs may be regarded as complex numbers of the form:

$$x(n) = PI(n) + jPQ(n) .$$

where n is the sample time number ranging from 1 to 32.

The 32-point complex FFT of the input sample sequence is computed in sub-outine 1008. Mathematically, the complex values X(k), k=0 to 31, are calculated, where $$X(k) = \sum_{n=1}^{32} x(n)\exp\{j2\pi nk/32\}$$

The variable k corresponds to frequency, according to the relationship frequency=k·Δf. For example, k=0 corresponds to zero frequency. Negative frequencies correspond to values of k between 16 and 31, since the spectrum of a sampled signal is periodic. For example, k=31 corresponds to the frequency −Δf. Several FFT algorithms are available for computing the X(k). An "in-place" algorithm is preferred since utilizes the least amount of memory, as is well known in the art. One such algotithm is described in a text by Oppenheim and Schafer, *Digital Signal Processing*, Prentice Hall 1975, pp 284–336.

Once the FFT is computed, the squared-magnitude, or power, of each of the FFT outputs X(k) is found in sub-routine 1010. The power quantities, denoted Z(k), are found by squaring and summing the real and imaginary parts of the X(k). Mathematically, $Z(k) = \{\text{Real } X(k)\}^2 + \{\text{Imag } X(k)\}^2$, for k=0 to 31. In routine 1012, the power quantities Z(k) are summed, or accumulated, into the power accumulator registers ZSUM(k). Each ZSUM(k) is updated by adding Z(k) to the present value of ZSUM(k) to obtain the new value.

The routines 1006, 1008, 1010, and 1012 are executed M times, as provided by decision block 1014. Thus, M sets of 32 prompt sample pairs are input and transformed, and M sets of powers are computed and summed. The numerical quantities present in the ZSUM accumulators at the conclusion of this process represent the 32 averaged power outputs corresponding to the 32 frequency bins. The largest of the 32 ZSUM values, denoted ZMAX, is determined by routine 1016, along with the corresponding value of k, denoted KMAX. KMAX is that value of k for which ZSUM(k)=ZMAX, i.e., ZSUM(KMAX)=ZMAX. The values ZMAX and KMAX are returned to μP 114 (via bus 750), and the maximum power measurement procedure of search processor 702 is terminated. The processor then waits for command from μP 114 to begin another measurement. It may be noted that, since the sampling rate $f_{iq}$ is necessarily greater than the Doppler frequency range, several values of the frequency variable k may correspond to frequencies outside the range of possible Doppler frequencies. In the example illustrated here, with $f_{iq}$ equal to 17.05 kHz the FFT frequency range is −8.525 kHz to +8.525 kHz, whereas the Doppler range is −7.5 kHz to +7.5 kHz. Therefore in practice, the power calculations pertaining to those frequencies outside the Doppler range may be skipped, and the maximum average power selection routine 1016 may ignore those "extraneous" frequency bins as well, since there is no possibility of signal presence there. The frequency search range may be similarly restricted if there is some a priori knowledge of Doppler frequency.

Figure 11:
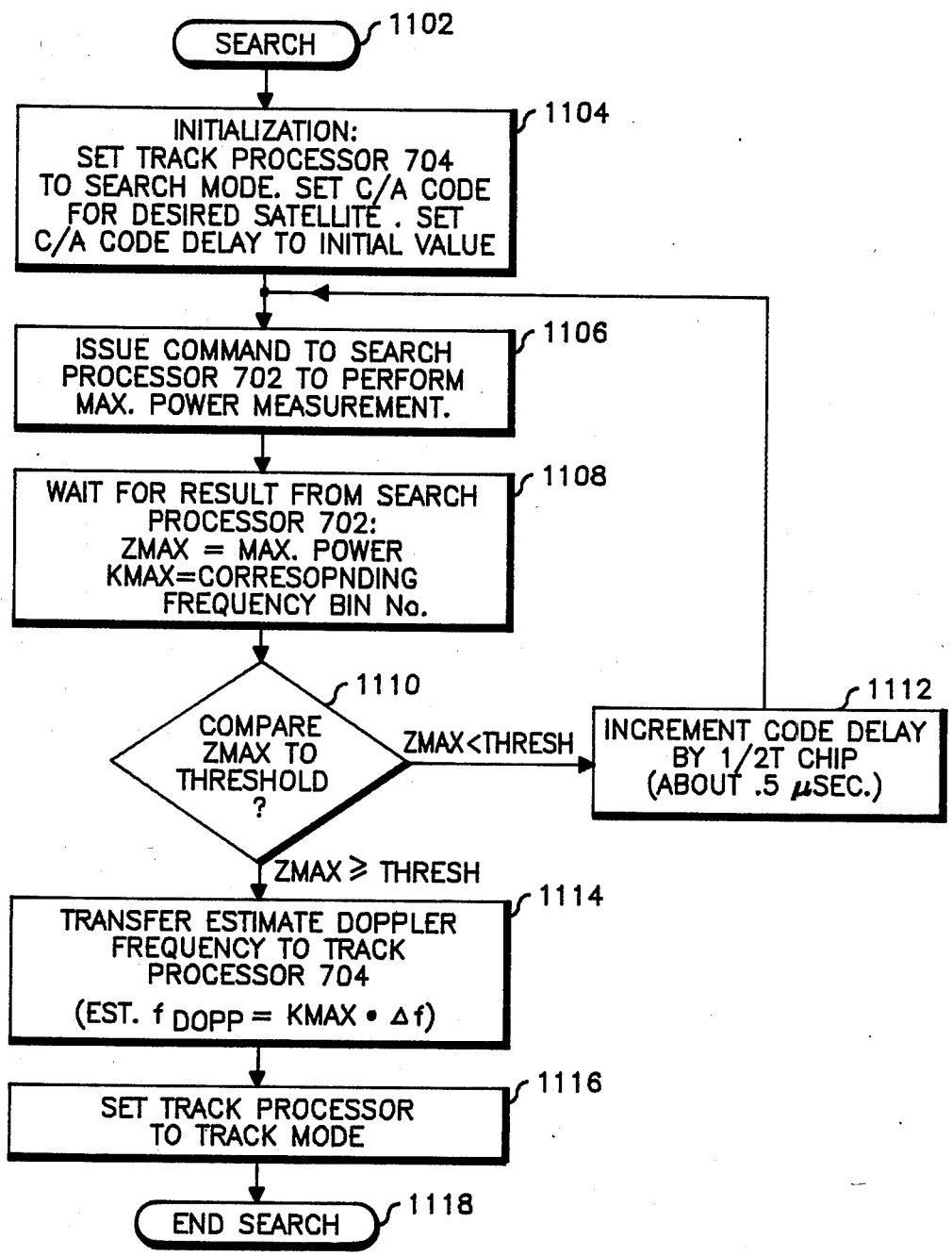
FIG. 11 is a flow diagram of the search procedure performed by microprocessor 114 of FIG. 1 in conjunction with search processor 702, in accordance with the improved search method of the invention.

A flow diagram of the search control procedure executed by microprocessor 114 is shown in FIG. 11. The search routine is entered at block 1102. An initialization process is carried out according to routine 1104. First, the appropriate tracking processor (704 in this channel 1 example) is set to search mode by sending a signal causing switch 880 to be set to position 1. Next, the C/A mode number corresponding to the desired satellite is sent through track processor 704 (and bus 750) to the appropriate code generator of DSP 110. Finally, an initial C/A code delay value may also be sent to the code generator, if desired.

Upon completion of the initialization procedure 1104, $\mu$P 114 issues a command to search processor 702 to perform a maximum average power measurement (item 1106). Microprocessor 114 then waits (item 1108) for measurement results from processor 702, namely, the maximum power value ZMAX and the corresponding frequency bin number KMAX. In decision block 1110, ZMAX is compared to a threshold. If ZMAX is less than the threshold, the search at the present code delay is deemed unsuccessful. In such case, the code delay is incremented (block 1112) by sending an incremented code delay to the C/A code generator via track processor 704, and the search measurement is repeated.

The loop comprising blocks 1106, 1108, 1110, and 1112 is executed repeatedly until the quantity ZMAX is greater than or equal to the threshold. When this occurs, search is deemed successful, and the estimated Doppler frequency KMAX·$\Delta$f is transferred (item 1114) to track processor 704 (specifically to port 846d of quadrature VFO 846). Track processor 704 is then set by item 1116 to the track mode by setting switch 880 to position 0, and tracking commences. The search procedure executed by microprocessor 114 is then terminated (block 1118), until such time as it is reactivated by some higher level routine. Modifications to the improved search procedure described above may occur to those skilled in the art. The particular partitioning of functions between search processor 702 and $\mu$P 114 might be changed, for example, by having the search processor perform more of the search control functions. As with the tracking/data processor, an important advantage of the programmable implementation made possible by the receiver architecture disclosed herein is that search operations may be easily and flexibly modified to accommodate varying receiver requirements.

In summary, the foregoing describes an apparatus and method for receiving a plurality of GPS C/A coded signals, wherein a substantial part of the processing may be advantageously implemented using digital circuitry, and wherein an improved method for rapid initial acquisition of signals is employed. While the preferred features of the invention have been shown by way of illustration, other modifications and changes will occur to those skilled in the art. It is, therefore, to be understood that the present claims are intended to cover all such modifications and changes as fall within the true spirit and scope of the present invention.

I claim:

1. In a spread-spectrum receiver, for receiving one or more direct-sequence-coded signals, each of which may be Doppler shifted from its nominal carrier frequency, wherein for each signal a code delay/Doppler frequency search procedure must be carried out prior to activation of delay-tracking and carrier-recovery loops, an improved method of Doppler frequency search for each desired signal, and for each code delay search trial, comprising the steps of:

a. inputting N consecutive digitized samples of a signal equal to a filtered product of a down-converted received signal multiplied by a locally-generated code of the desired signal, the code delay of said locally-generated code being that of the current code delay search trial, said filtering passing, at least, the band of frequencies corresponding to the entire range of possible Doppler-shifted carrier frequency of said down-converted received signal;

b. calculating the N-point discrete Fourier transform of said block of N samples to produce N complex-valued transformed output samples, each corresponding to one of N equally-spaced search frequencies in the band from zero Hertz to fs (or, equivalently, in the band from $-f_s/2$ to $+f_s/2$), $f_s$ being the sampling frequency of the samples input in step a;

c. calculating the square of the magnitude of each of said N complex-valued output samples to produce N power quantities, corresponding to the N said search frequencies; and d. performing steps a through c M times, summing the M power quantities produced for each of the N said search frequencies, to produce N quantities proportional to the average power of each respective N search frequency, the maximum of said average power quantities exhibiting indicia of the presence and approximate Doppler frequency shift of said desired signal.

2. In a spread-spectrum receiver, for receiving one or more direct-sequence-coded signals, each of which may be Doppler shifted from its nominal carrier frequency, wherein for each signal a code delay/Doppler frequency search procedure must be carried out prior to activation of delay-tracking and carrier-recovery loops, an improved method of Doppler frequency search for each desired signal, and for each code delay search trial, comprising the steps of:

a. inputting N consecutive digitized samples of a signal equal to a filtered product of a down-converted received signal multiplied by a locally-generated code of the desired signal, the code delay of said locally-generated code being that of the current code delay search trial, said filtering passing, at least, the band of frequencies corresponding to the entire range of possible Doppler-shifted carrier frequencies of said down-converted received signal;

b. calculating the N-point discrete Fourier transform of said block of N samples to produce N complex-valued transformed output samples, each corresponding to one of N equally-spaced search frequencies in the band from zero Hertz to fs (or, equivalently, in the band from $-f_2/2$ to $+f_s/2$), $f_s$ being the sampling frequency of the samples input in step a;

c. calculating the square of the magnitude of each of said N complex-valued output samples to produce N power quantities, corresponding to the N said search frequencies;

d. performing steps a through c M times, summing the M power quantities produced for each of the N said search frequencies, to produce N quantities proportional to the average power of each respective N search frequency;

e. selecting the maximum of the N average power quantities, and calculating the corresponding frequency; and f. comparing the maximum average power quantity to a threshold, the fact of said threshold being exceeded signifying that the current code delay is approximately correct (local code approximately time-aligned to received code), with the frequency of maximum average power found in step e indicating the approximate Doppler frequency shift, and the fact of said threshold not being exceeded signifying that the current code delay is not approximately correct, and that another code delay should be tried.

3. In a global positioning system receiver, for receiving one or more course/access (C/A) coded signals, each of which may be Doppler shifted from its nominal carrier frequency, wherein for each signal a code delay/Doppler frequency search procedure must be carried out prior to activation of delay-tracking and carrier-recovery loops, an improved method of Doppler frequency search for each desired signal, and for each code delay search trial, comprising the steps of:

a. inputting N consecutive digitized samples of a signal equal to a filtered product of a down-converted received signal multiplied by a locally-generated code of the desired signal, the code delay of said locally-generated code being that of the current code delay search trial, said filtering passing, at least, the band of frequencies corresponding to the entire range of possible Doppler-shifted carrier frequencies of said down-converted received signal;

b. calculating the N-point discrete Fourier transform of said block of N samples to produce N complex-valued transformed output samples, each corresponding to one of N equally-spaced search frequencies in the band from zero Hertz to fs (or, equivalently, in the band from $-f_s/2$ to $+f_s/2$), $f_s$ being the sampling frequency of the samples input in step a;

c. calculating the square of the magnitude of each of said N complex-valued output samples to produce N power quantities, corresponding to the N said search frequencies; and d. performing steps a through c M times, summing the M power quantities produced for each of the N said search frequencies, to produce N quantities proportional to the average power of each respective search frequency, the maximum of said average power quantities exhibiting indicia of the presence and approximate Doppler frequency shift of said desired signal.

4. In a global positioning system receiver, for receiving one or more course/access (C/A) coded signals, each of which may be Doppler shifted from its nominal carrier frequency, wherein for each signal a code delay/Doppler frequency search procedure must be carried out to activation of delay-tracking and carrier-recovery loops, an improved method of Doppler frequency search for each desired signal, and for each code delay search trial, comprising the steps of:

a. inputting N consecutive digitized samples of a signal equal to a filtered product of a down-converted received signal multiplied by a locally-generated code of the desired signal, the code delay of said locally-generated code being that of the current code delay search trial, said filtering passing, at least, the band of frequencies corresponding to the entire range of possible Doppler-shifted carrier frequencies of said down-converted received signal;

b. calculating the N-point discrete Fourier transform of said block of N samples of produce N complex-valued transformed output samples, each corresponding to one of N equally-spaced search frequencies in the band from zero Hertz to fs (or, equivalently, in the band from $-f_s/2$ to $+f_s/2$), $f_s$ being the sampling frequency of the samples input in step a;

c. calculating the square of the magnitude of each of said N complex-valued output samples to produce N power quantities, corresponding to the N said search frequencies;

d. performing steps a through c M times, summing the M power quantities produced for each of the N said search frequencies, to produce N quantities proportional to the average power of each respective search frequency;

e. selecting the maximum of the N average power quantities, and calculating the corresponding frequency; and f. comparing the maximum average power quantity to a threshold, the face of said threshold being exceeded signifying that the current code delay is approximately correct (local code approximately time-aligned to received code), with the frequency of maximum average power found in step e indicating the approximate Doppler frequency shift, and the fact of said threshold not being exceeded signifying that the current code delay is not approximately correct, and that another code delay should be tried.

5. The method of claims 1, 2, 3 or 4, wherein the step of inputting comprises inputting 32 consecutive digitized samples.

6. The method of claim 1, 2, 3 or 4, wherein step (d) in performed 8 times

7. A spread-spectrum receiver for receiving one or more direct-sequence-coded signals, each of which may be Doppler shifted from its nominal carrier frequency, wherein for each signal a code delay/Doppler frequency search procedure must be carried out prior to activation of delay-tracking and carrier-recovery loops, said receiver comprising:

a. means for inputting N consecutive digitized samples of a signal equal to a filtered product of a down-converted received signal multiplied by a locally-generated code of a desired signal, the code delay of said locally-generated code being that of the current code delay search trial, said filtering passing, at least, the band of frequencies corresponding to the entire range of possible Doppler-shifted carrier frequency of said down-converted received signal;

b. means for calculating the N-point discrete Fourier transform of said block of N samples to produce N complex-valued transformed output samples, each corresponding to one of N equally-spaced search frequencies in the band from zero Hertz to fs (or, equivalently, in the band from $-f_s/2$ to $+f_s/2$), $f_s$ being the sampling frequency of said N samples;

c. means for calculating the square of the magnitude of each of said N complex-valued output samples to produce N power quantities, corresponding to the N said search frequencies; and d. means for summing, M times, the power quantities produced for each of the N said search frequencies, to produce N quantities proportional to the average power of each respective N search frequency, the maximum of said average power quantities exhibiting indicia of the presence and approximate Doppler frequency shift of said desired signal.

8. A spread-spectrum receiver, for receiving one or more direct-sequence-coded signals, each of which may be Doppler shifted from its nominal carrier frequency, wherein for each signal a code delay/Doppler frequency search procedure must be carried out prior to activation of delay-tracking and carrier-recovery loops, said receiver comprising:

a. means for inputting N consecutive digitized samples of a signal equal to a filtered product of a down-converted received signal multiplied by a locally-generated code of a desired signal, the code delay of said locally-generated code being that of the current code delay search trial, said filtering passing, at least, the band of frequencies corresponding to the entire range of possible Doppler-shifted carrier frequencies of said down-converted received signal;

b. means for calculating the N-point discrete Fourier transform of said block of N samples to produce N complex-valued transformed output samples, each corresponding to one of N equally-spaced search frequencies in the band from zero Hertz to fs (or, equivalently, in the band from $-f_s/2$ to $+f_s/2$), $f_s$ being the sampling frequency of said N samples;

c. means for calculating the square of the magnitude of each of said N complex-valued output samples to produce N power quantities, corresponding to the N said search frequencies;

d. means for summing, M times, the power quantities produced for each of the N said search frequencies, to produce N quantities proportional to the average power of each respective N search frequency;

e. means for selecting the maximum of the N average power quantities, and calculating the corresponding frequency; and f. means for comparing the maximum average power quantity to a threshold, the fact of said threshold being exceeded signifying that the current code delay is approximately correct (local code approximately time-aligned to received code), with the frequency of maximum average power indicating the approximate Doppler frequency shift, and the fact of said threshold not being exceeded signifying that the current code delay is not approximately correct, and that another code delay should be tried.

9. A global positioning system receiver, for receiving one or more course/access (C/A) coded signals, each of which may be Doppler shifted from its nominal carrier frequency, wherein for each signal a code delay/Doppler frequency search procedure must be carried out prior to activation of delay-tracking and carrier-recovery loops, said receiver comprising:

a. means for inputting N consecutive digitized samples of a signal equal to a filtered product of a down-converted received signal multiplied by a locally-generated code of a desired signal, the code delay of said locally-generated code being that of the current code delay search trial, said filtering passing, at least, the band of frequencies corresponding to the entire range of possible Doppler-shifted carrier frequencies of said down-converted received signal;

b. means for calculating the N-point discrete Fourier transform of said block of N samples to produce N complex-valued transformed output samples, each corresponding to one of N equally-spaced search frequencies in the band from zero Hertz to fs.(or, equivalently, in the band from $-f_s/2$ to $+f_s/2$), $f_s$ being the sampling frequency of said N samples;

c. means for calculating the square of the magnitude of each of said N complex-valued output samples to produce N power quantities, corresponding to the N said search frequencies; and d. means for summing M times, the power quantities produced for each of the N said search frequencies, to produce N quantities proportional to the average power of each respective search frequency, the maximum of said average power quantities exhibiting indicia of the presence and approximate Doppler frequency shift of said desired signal.

10. A global positioning system receiver, for receiving one or more course/access (C/A) coded signals, each of which may be Doppler shifted from its nominal carrier frequency, wherein for each signal a code delay/Doppler frequency search procedure must be carried out to activation of delay-tracking and carrier-recovery loops, said receiver comprising:

a. means for inputting N consecutive digitized samples of a signal equal to a filtered product of a down-converted received signal multiplied by a locally-generated code of a desired signal, the code delay of said locally-generated code being that of the current code delay search trial, said filtering passing, at least, the band of frequencies corresponding to the entire range of possible Doppler-shifted carrier frequencies of said down-converted received signal;

b. means for calculating the N-point discrete Fourier transform of said block of N samples of produce N complex-valued transformed output samples, each corresponding to one of N equally-spaced search frequencies in the band from zero Hertz to fs (or, equivalently, in the band from $-f_s/2$ to $+f_s/2$), $f_s$ being the sampling frequency of said N samples;

c. means for calculating the square of the magnitude of each of said N complex-valued output samples to produce N power quantities, corresponding to the N said search frequencies;

d. means for summing, M times, the power quantities produced for each of the N said search frequencies, to produce N quantities proportional to the average power of each respective search frequency;

e. means for selecting the maximum of the N average power quantities, and calculating the corresponding frequency; and f. means for comparing the maximum average power quantity to a threshold, the face of said threshold being exceeded signifying that the current code delay is approximately correct (local code approximately time-aligned to received code), with the frequency of maximum average power found in step e indicating the approximate Doppler frequency shift, and the fact of

* * * * *

UNITED STATES PATENT AND TRADEMARK OFFICE
CERTIFICATE OF CORRECTION

PATENT NO. : 4,701,934

DATED : October 20, 1987

INVENTOR(S) : Jasper, Steven C.

It is certified that error appears in the above-identified patent and that said Letters Patent is hereby corrected as shown below:

Column 28, line 67, after the words "fact of" please add --said threshold not being exceeded signifying that the current code delay is not approximately correct, and that another code delay should be tried.--

Signed and Sealed this

Twenty-eighth Day of June, 1988

Attest:

DONALD J. QUIGG

Attesting Officer

Commissioner of Patents and Trademarks